United States Patent
Singh et al.

(10) Patent No.: US 12,432,296 B2
(45) Date of Patent: Sep. 30, 2025

(54) MALICIOUS CALL ATTACK DETECTION AND MITIGATION

(71) Applicant: QUALCOMM Incorporated, San Diego, CA (US)

(72) Inventors: Gaurav Singh, Hyderabad (IN); Sridhar Anumala, Hyderabad (IN); Subrato Kumar De, San Diego, CA (US); Mugdha Sanjay Patil, Hyderabad (IN); Ankur Bhattacharjee, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 226 days.

(21) Appl. No.: 18/469,370

(22) Filed: Sep. 18, 2023

(65) Prior Publication Data

US 2025/0097341 A1    Mar. 20, 2025

(51) Int. Cl.
*H04M 3/22* (2006.01)
*H04M 3/436* (2006.01)

(52) U.S. Cl.
CPC ....... *H04M 3/2281* (2013.01); *H04M 3/4365* (2013.01)

(58) Field of Classification Search
CPC ............. H04M 3/2281; H04M 3/4365; H04M 2203/6027; H04M 7/0078; H04M 3/42059; H04M 3/436; H04W 12/61; H04W 12/122
See application file for complete search history.

(56) References Cited

U.S. PATENT DOCUMENTS

| | | | |
|---|---|---|---|
| 7,653,188 B2 * | 1/2010 | Kloberdans | H04M 3/436 379/189 |
| 10,154,136 B1 * | 12/2018 | Newstadt | H04M 3/4365 |
| 2021/0385320 A1 * | 12/2021 | Nakarmi | H04M 15/00 |

FOREIGN PATENT DOCUMENTS

| | | | | |
|---|---|---|---|---|
| EP | 1746814 A2 * | 1/2007 | | H04L 65/1079 |
| EP | 2224762 B1 | 4/2019 | | |
| GB | 2584156 A | 11/2020 | | |

OTHER PUBLICATIONS

International Search Report and Written Opinion—PCT/US2024/046239—ISA/EPO—Nov. 28, 2024.

* cited by examiner

*Primary Examiner* — Akelaw Teshale
(74) *Attorney, Agent, or Firm* — Polsinelli

(57) ABSTRACT

Systems and techniques are provided for wireless communications. A process can include determining that a quantity of a plurality of Mobile Terminated (MT) calls received within a first time period is greater than a first configured threshold. A process can include determining a subset of non-verified MT calls from the plurality of MT calls based on a call verification score for each respective MT call of the plurality of MT calls received within the first time period. A process can include determining that a quantity of non-verified MT calls included in the subset is greater than a second configured threshold. A process can include performing modem-level blocking based on determining a corresponding calling party identity associated with a non-verified MT call included in the subset.

30 Claims, 8 Drawing Sheets

MALICIOUS CALL ATTACK DETECTION AND MITIGATION

FIELD

Aspects of the present disclosure generally relate to wireless communication. In some implementations, examples are described for detecting and mitigating silent Mobile Terminated (MT) call attacks on a user equipment (UE).

BACKGROUND

Wireless communications systems are deployed to provide various telecommunication services, including telephony, video, data, messaging, broadcasts, among others. Wireless communications systems have developed through various generations, including a first-generation analog wireless phone service (1G), a second-generation (2G) digital wireless phone service (including interim 2.5G networks), a third-generation (3G) high speed data, Internet-capable wireless service, a fourth-generation (4G) service (e.g., Long-Term Evolution (LTE), WiMax), and a fifth-generation (5G) service (e.g., New Radio (NR)). There are presently many different types of wireless communications systems in use, including cellular and personal communications service (PCS) systems. Examples of known cellular systems include the cellular Analog Advanced Mobile Phone System (AMPS), and digital cellular systems based on code division multiple access (CDMA), frequency division multiple access (FDMA), time division multiple access (TDMA), the Global System for Mobile communication (GSM), etc.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

Disclosed are systems, methods, apparatuses, and computer-readable media for performing wireless communication. According to at least one illustrative example, an apparatus of a user equipment (UE) is provided. The apparatus includes at least one memory and at least one processor coupled to the at least one memory. The at least one processor is configured to: determine that a quantity of a plurality of Mobile Terminated (MT) calls received within a first time period is greater than a first configured threshold; determine a subset of non-verified MT calls from the plurality of MT calls based on a call verification score for each respective MT call of the plurality of MT calls received within the first time period; determine that a quantity of non-verified MT calls included in the subset is greater than a second configured threshold; and perform modem-level blocking based on determining a corresponding calling party identity associated with a non-verified MT call included in the subset.

In another illustrative example, a method for wireless communication is provided, the method including: determining that a quantity of a plurality of Mobile Terminated (MT) calls received within a first time period is greater than a first configured threshold; determining a subset of non-verified MT calls from the plurality of MT calls based on a call verification score for each respective MT call of the plurality of MT calls received within the first time period; determining that a quantity of non-verified MT calls included in the subset is greater than a second configured threshold; and performing modem-level blocking based on determining a corresponding calling party identity associated with a non-verified MT call included in the subset.

In another illustrative example, a non-transitory computer-readable storage medium comprising instructions stored thereon which, when executed by at least one processor, causes the at least one processor to: determine that a quantity of a plurality of Mobile Terminated (MT) calls received within a first time period is greater than a first configured threshold; determine a subset of non-verified MT calls from the plurality of MT calls based on a call verification score for each respective MT call of the plurality of MT calls received within the first time period; determine that a quantity of non-verified MT calls included in the subset is greater than a second configured threshold; and perform modem-level blocking based on determining a corresponding calling party identity associated with a non-verified MT call included in the subset.

In another illustrative example, an apparatus is provided for wireless communication. The apparatus includes: means for determining that a quantity of a plurality of Mobile Terminated (MT) calls received within a first time period is greater than a first configured threshold; means for determining a subset of non-verified MT calls from the plurality of MT calls based on a call verification score for each respective MT call of the plurality of MT calls received within the first time period; means for determining that a quantity of non-verified MT calls included in the subset is greater than a second configured threshold; and means for performing modem-level blocking based on determining a corresponding calling party identity associated with a non-verified MT call included in the subset.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip implementations or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

Other objects and advantages associated with the aspects disclosed herein will be apparent to those skilled in the art based on the accompanying drawings and detailed description. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and aspects, will become more apparent upon referring to the following specification, claims, and accompanying drawings.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
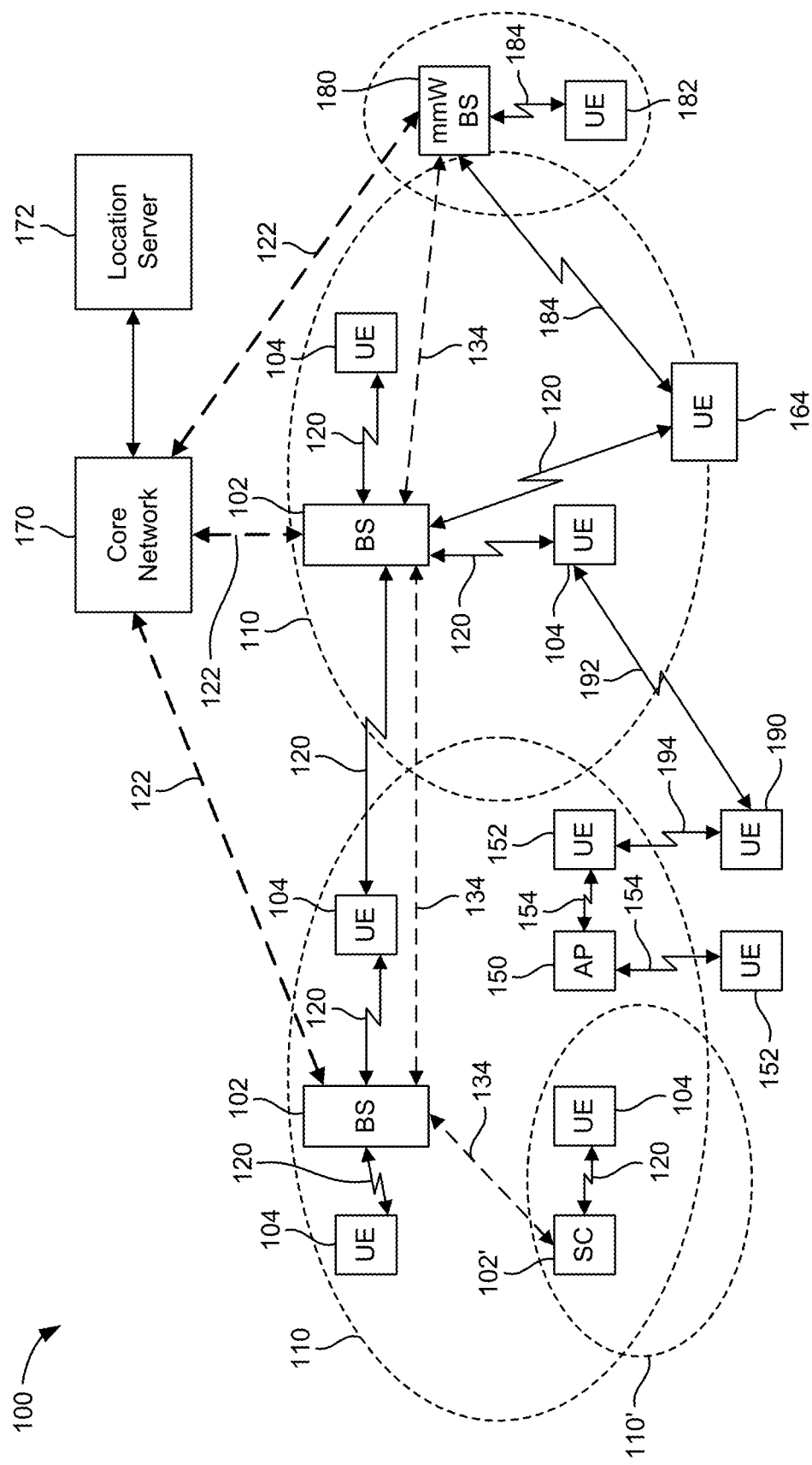
FIG. 1 is a block diagram illustrating an example of a wireless communication network, in accordance with some examples.

Certain aspects of this disclosure are provided below for illustration purposes. Alternate aspects may be devised without departing from the scope of the disclosure. Additionally, well-known elements of the disclosure will not be described in detail or will be omitted so as not to obscure the relevant details of the disclosure. Some of the aspects described herein may be applied independently and some of them may be applied in combination as would be apparent to those of skill in the art. In the following description, for the purposes of explanation, specific details are set forth in order to provide a thorough understanding of aspects of the application. However, it will be apparent that various aspects may be practiced without these specific details. The figures and description are not intended to be restrictive.

The ensuing description provides example aspects only, and is not intended to limit the scope, applicability, or configuration of the disclosure. Rather, the ensuing description of the example aspects will provide those skilled in the art with an enabling description for implementing an example aspect. It should be understood that various changes may be made in the function and arrangement of elements without departing from the scope of the application as set forth in the appended claims.

Wireless communication networks can be deployed to provide various communication services, such as voice, video, packet data, messaging, broadcast, any combination thereof, or other communication services. A wireless communication network may support both access links and sidelinks for communication between wireless devices. An access link may refer to any communication link between a client device (e.g., a user equipment (UE), a station (STA), or other client device) and a base station (e.g., a 3GPP gNB for 5G/NR, a 3GPP eNB for 4G/LTE, a Wi-Fi access point (AP), or other base station). For example, an access link may support uplink signaling, downlink signaling, connection procedures, etc. An example of an access link is a Uu link or interface (also referred to as an NR-Uu) between a 3GPP gNB and a UE.

A Mobile Originated (MO) call is a call initiated by a mobile terminal (e.g., UE) in a wireless communication network. In an MO call, the UE is the calling party, and initiates call setup procedures with the network to establish a voice or data session. A Mobile Terminated (MT) call is a call that is received by (e.g., terminates at) a mobile terminal (e.g., UE). In an MT call, the UE is the called party. The network initiates the call setup procedures to alert the UE of an incoming voice or data session. The term "calling party" can refer to an entity (e.g., a user, a device, and/or a UE, etc.) that initiates a communication session (e.g., such as a voice call or data transmission). A calling party transmits a request to the network to establish a connection with a "called party," where the called party refers to a second entity (e.g., a user, a device, and/or a UE, etc.) which is the recipient of the communication from the calling party. A "calling party identity" can refer to unique information used to identify a respective calling party during a communication session. For instance, the calling party identity can be the phone number associated with the calling party device (e.g., calling party UE). In some examples, such as in 5G NR, the calling party identity may be configured as a digital identifier uniquely associated with the calling parry device (e.g., calling party UE). For instance, the calling party identity can be an International Mobile Subscriber Identity (IMSI), a Temporary Mobile Subscriber Identity (TMSI), etc.

In some examples, MT calls may be prioritized over MO calls. For instance, when an MT call paging message is received from the network by a UE (e.g., indicative of an incoming MT call for the UE), the MT call is ongoing and currently in progress at the time of the paging message. An MO call is initiated by a UE (e.g., a user of the UE), and can be performed at a later time, while it can be more challenging to postpone or delay the performance of call setup procedures for an incoming MT call.

An attacker or malicious user may perform multiple call attempts to a particular UE (e.g., also referred to as a "victim UE"). The attacker places or initiates an MO call, and an MT call is initiated for the victim UE. In the call setup procedure, one or more steps can be performed prior to alerting at the victim UE (e.g., prior to ringing or other indication of the incoming call at the victim UE). For instance, the sequence of events corresponding to an MT call can include:
1) Paging: The network sends a paging message to the UE indicative of the incoming MT call.
2) RRC Connection: If the UE is in idle mode, the UE establishes a Radio Resource Control (RRC) connection with the network.
3) Authentication: Mutual authentication is performed between the UE and the network, and security keys are generated.
4) Initial Context Setup: The network sends an Initial Context Setup Request to allocate network resources (e.g., RF and/or upper layer resources) and set up bearers for the MT call.
5) Call Signaling: Session Initiation Protocol (SIP) messages can be exchanged between the UE and the network for call setup.
6) Alerting: The UE alerts (e.g., rings) for the incoming call
7) Call Acceptance: The user accepts the call, and the UE sends a call acceptance message to the network.
8) Media Path Setup: A Real-time Transport Protocol (RTP) media path is established for voice data.
9) Call Active: The call becomes active, and voice data can be exchanged between the UE and the network.

In some aspects, an attacker or malicious user can perform an MT call attack (e.g., also referred to as a "silent MT call attack") based on performing multiple MT call attempts to a victim UE and disconnecting the MT call attempt before the alerting (e.g., ringing) at the victim UE. The attacker may initiate multiple MT call attempts in a relatively short period of time, where each MT call attempt causes the victim UE to perform one or more of steps 1-5 of the example call setup procedure above prior to the MT call attempt being disconnected.

In a silent MT call attack, the multiple MT call attempts can cause the modem of the victim UE to repeatedly allocate and de-allocate RF sources (e.g., upper layer network resources) for the incoming MT call attempt. While the victim UE performs the one or more initial steps of the call setup procedure (e.g., while the silent MT call attack is being performed), a legitimate caller's MT call cannot be connected to the victim UE. Additionally, while the victim UE performs the one or more initial steps of the call setup procedure, MO voice call initiation by the victim UE may be blocked or rejected (e.g., based on MT calls being prioritized over MO calls).

A silent MT call attack can additionally be associated with network and/or connectivity performance degradation (e.g., such as in examples where the incoming MT call attempt causes the UE to perform Inter-Radio Access Technology (IRAT) mobility to fallback from the primary RAT (e.g., 5G NR) to a legacy RAT (e.g., LTE) to setup the call). A silent MT call attack can, in at least some examples, be associated with increased power consumption and battery drain at the victim UE, as the silent MT call attack causes the modem of the victim UE to repeatedly allocate and de-allocate RF resources for handling each incoming MT call attempt.

In some cases, a victim UE (e.g., and/or a modem thereof) may be unable to detect the incoming MT call attempts of a silent MT call attack from the legitimate incoming MT call attempts that may also be received by the victim UE. There is a need for systems and techniques that can be used to detect silent MT call attacks at a victim UE. There is also a need for systems and techniques that can be used to differentiate malicious incoming MT call attempts (e.g., associated with a silent MT call attack) from legitimate or non-malicious incoming MT call attempts (e.g., not associated with a silent MT call attack). There is a further need for systems and techniques that can be used to mitigate a silent MT call attack detected at or by the victim UE.

Systems, apparatuses, processes (also referred to as methods), and computer-readable media (collectively referred to as "systems and techniques") are described herein that can be used to perform malicious call attack detection and/or mitigation for MT calls. In some examples, the systems and techniques can be implemented by a UE that receives one or more incoming MT call attempts. In some aspects, the systems and techniques can be used to detect and/or mitigate a silent MT call attack in a standalone call session. For instance, a standalone call session may be a voice over new radio (VONR) call session, where voice services are implemented over a 5G NR network. In another example, a standalone call session may be a voice over LTE (VOLTE) call session, where voice services are implemented over a 4G LTE network.

In some aspects, the systems and techniques can be used to detect and/or mitigate a silent MT call attack in an inter-RAT (IRAT) mobility call session. For instance, an IRAT mobility call session may be an NR to LTE IRAT (e.g., VONR to VOLTE IRAT mobility), where a victim UE performs Evolved Packet System (EPS) fallback (EPSFB) from NR to LTE to continue voice services during an MT call attempt. In another example, an IRAT mobility call session may be an LTE to 3G/2G IRAT (e.g., VOLTE to 3G IRAT mobility, VOLTE to 2G IRAT mobility, etc.), where a victim UE performs circuit-switched fallback (CSFB) from LTE to a legacy RAT (e.g., 3G, 2G, etc.) to continue voice services during an MT call attempt.

In one illustrative example, the systems and techniques can detect a silent MT call attack at a victim UE using a sliding time window. For instance, the sliding time window can be implemented using an interval of $T_1$ seconds. The number of incoming MT call attempts during the sliding time window $T_1$ can be measured and compared to a threshold N. In some aspects, the incoming MT call attempts can be classified as malicious or non-malicious (e.g., associated with a silent MT call attack or not associated with a silent MT call attack). Based on the number of silent MT calls received in the sliding time window of $T_1$ seconds being greater than equal to the threshold N, silent MT call attack mitigation can be performed.

In some aspects, silent MT call attack mitigation can include determining the number of legitimate MT call attempts in the overall number of calls N (e.g., based on mitigation being initiated once the number of silent MT calls ≥N). The determined subset of legitimate (e.g., verified) MT call attempts, N', can be removed from the overall number of calls.

Mitigation can be performed for a remaining (N-N') MT call attempts that may be malicious and/or associated with a silent MT call attack. In some aspects, mitigation can be performed based on a determination that the number of (N-N') MT call attempts is greater than a threshold. For instance, the threshold can be an EFS configured threshold. In one illustrative example, mitigation can include performing modem-level blocking of a cellular number or calling identity associated with the (N-N') MT call attempts. Based on the modem-level blocking of the malicious MT call attempts, subsequent MT call attempts initiated to the victim UE may be aborted at the paging step of the MT call setup procedure. For instance, an MT call paging message can be received by the victim UE, and the call setup procedure aborted based on determining from the page that the caller is included in the modem-level blocking applied during the mitigation).

In some aspects, the cellular number and/or calling identity associated with a malicious MT call attempt (e.g., associated with one of the (N-N') MT call attempts) can be blocked at the modem level for a time $T_2$. In some cases, the modem-level blocking can be removed at the expiration of the time $T_2$. The time $T_2$ can be measured from the respective time when modem-level blocking was initiated for each blocked cellular number or calling identity.

In some aspects, based on a victim UE detecting a silent MT call attack, the systems and techniques can be used to perform iterative or successive rounds of detection and mitigation using faster (e.g., shorter) detection intervals. For instance, when a silent MT call attack has not yet been detected by the victim UE, the silent MT call attack mitigation may be performed based on the victim UE detecting greater than N silent MT calls within the time interval $T_1$.

In a next (e.g., second) iteration of the silent MT call attack detection and mitigation (e.g., after the expiration of the modem-level blocking timer $T_2$ set during the first iteration), the victim UE can perform mitigation based on the victim UE detecting greater than N/2 silent MT calls within the time interval $T_1$. In a third iteration of the MT call attack detection and mitigation, the victim UE may perform mitigation based on the victim UE detecting greater than N/3 silent MT calls within the time interval $T_1$, . . . , etc.

In some aspects, the victim UE can perform silent MT call attack detection and mitigation based on the number of silent MT calls received during the time interval $T_1$ being greater than or equal to N/X, where the value of X is incremented by one for successive iterations of the MT call attack detection and mitigation process while a silent MT call attack is ongoing for the victim UE.

Further aspects of the systems and techniques will be described with respect to the figures.

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

As used herein, the terms "user equipment" (UE) and "network entity" are not intended to be specific or otherwise limited to any particular radio access technology (RAT), unless otherwise noted. In general, a UE may be any wireless communication device (e.g., a mobile phone, router, tablet computer, laptop computer, and/or tracking device, etc.), wearable (e.g., smartwatch, smart-glasses, wearable ring, and/or an extended reality (XR) device such as a virtual reality (VR) headset, an augmented reality (AR) headset or glasses, or a mixed reality (MR) headset), vehicle (e.g., automobile, motorcycle, bicycle, etc.), aircraft (e.g., an airplane, jet, unmanned aerial vehicle (UAV) or drone, helicopter, airship, glider, etc.), and/or Internet of Things (IoT) device, etc., used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11 communication standards, etc.), and so on.

A network entity can be implemented in an aggregated or monolithic base station architecture, or alternatively, in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. A base station (e.g., with an aggregated/monolithic base station architecture or disaggregated base station architecture) may operate according to one of several RATs in communication with UEs depending on the network in which it is deployed, and may be alternatively referred to as an access point (AP), a network node, a NodeB (NB), an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems, a base station may provide edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, or a forward traffic channel, etc.). The term traffic channel (TCH), as used herein, can refer to either an uplink, reverse or downlink, and/or a forward traffic channel.

The term "network entity" or "base station" (e.g., with an aggregated/monolithic base station architecture or disaggregated base station architecture) may refer to a single physical transmit receive point (TRP) or to multiple physical TRPs that may or may not be co-located. For example, where the term "network entity" or "base station" refers to a single physical TRP, the physical TRP may be an antenna of the base station corresponding to a cell (or several cell sectors) of the base station. Where the term "network entity" or "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (e.g., a network of spatially separated antennas connected to a common source via a transport medium) or a remote radio head (RRH) (e.g., a remote base station connected to a serving base station). Alternatively, the non-co-located physical TRPs may be the serving base station receiving the measurement report from the UE and a neighbor base station whose reference radio frequency (RF) signals (e.g., or simply "reference signals") the UE is measuring. Because a TRP is the point from which a base station transmits and receives wireless signals, as used herein, references to transmission from or reception at a base station are to be understood as referring to a particular TRP of the base station.

In some implementations that support positioning of UEs, a network entity or base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

As described herein, a node (which may be referred to as a node, a network node, a network entity, or a wireless node) may include, be, or be included in (e.g., be a component of) a base station (e.g., any base station described herein), a UE (e.g., any UE described herein), a network controller, an apparatus, a device, a computing system, an integrated access and backhauling (IAB) node, a distributed unit (DU), a central unit (CU), a remote/radio unit (RU) (which may also be referred to as a remote radio unit (RRU)), and/or another processing entity configured to perform any of the techniques described herein. For example, a network node may be a UE. As another example, a network node may be a base station or network entity. As another example, a first network node may be configured to communicate with a second network node or a third network node. In one aspect of this example, the first network node may be a UE, the second network node may be a base station, and the third network node may be a UE. In another aspect of this example, the first network node may be a UE, the second network node may be a base station, and the third network node may be a base station. In yet other aspects of this example, the first, second, and third network nodes may be different relative to these examples. Similarly, reference to a UE, base station, apparatus, device, computing system, or the like may include disclosure of the UE, base station, apparatus, device, computing system, or the like being a network node. For example, disclosure that a UE is configured to receive information from a base station also discloses that a first network node is configured to receive information from a second network node. Consistent with this disclosure, once a specific example is broadened in accordance with this disclosure (e.g., a UE is configured to receive information from a base station also discloses that a first network node is configured to receive information from a second network node), the broader example of the narrower example may be interpreted in the reverse, but in a broad open-ended way. In the example above where a UE is configured to receive information from a base station also discloses that a first network node is configured to receive information from a second network node, the first network node may refer to a first UE, a first base station, a first apparatus, a first device, a first computing system, a first set of one or more one or more components, a first processing entity, or the like configured to receive the information; and the second network node may refer to a second UE, a second base station, a second apparatus, a second device, a second computing system, a second set of one or more components, a second processing entity, or the like.

As described herein, communication of information (e.g., any information, signal, or the like) may be described in various aspects using different terminology. Disclosure of one communication term includes disclosure of other communication terms. For example, a first network node may be described as being configured to transmit information to a second network node. In this example and consistent with this disclosure, disclosure that the first network node is configured to transmit information to the second network node includes disclosure that the first network node is configured to provide, send, output, communicate, or transmit information to the second network node. Similarly, in this example and consistent with this disclosure, disclosure that the first network node is configured to transmit information to the second network node includes disclosure that the second network node is configured to receive, obtain, or decode the information that is provided, sent, output, communicated, or transmitted by the first network node.

An RF signal comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

Various aspects of the systems and techniques described herein will be discussed below with respect to the figures. According to various aspects, FIG. 1 illustrates an example of a wireless communications system 100. The wireless communications system 100 (e.g., which may also be referred to as a wireless wide area network (WWAN)) can include various base stations 102 and various UEs 104. In some aspects, the base stations 102 may also be referred to as "network entities" or "network nodes." One or more of the base stations 102 can be implemented in an aggregated or monolithic base station architecture. Additionally, or alternatively, one or more of the base stations 102 can be implemented in a disaggregated base station architecture, and may include one or more of a central unit (CU), a distributed unit (DU), a radio unit (RU), a Near-Real Time (Near-RT) RAN Intelligent Controller (RIC), or a Non-Real Time (Non-RT) RIC. The base stations 102 can include macro cell base stations (e.g., high power cellular base stations) and/or small cell base stations (e.g., low power cellular base stations). In an aspect, the macro cell base station may include eNBs and/or ng-eNBs where the wireless communications system 100 corresponds to a long-term evolution (LTE) network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., which may be part of core network 170 or may be external to core network 170). In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC or 5GC) over backhaul links 134, which may be wired and/or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), a virtual cell identifier (VCI), a cell global identifier (CGI)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (e.g., also referred to as reverse link) transmissions from a UE 104 to a base station 102 and/or downlink (e.g., also referred to as forward link) transmissions from a base station 102 to a UE 104. The communication links 120 may use MIMO antenna technology, including spatial multiplexing, beamforming, and/or transmit diversity. The communication links 120 may be provided using one or more carrier frequencies. Allocation of carriers may be asymmetric with respect to downlink and uplink (e.g., a greater or lesser quantity of carriers may be allocated for downlink than for uplink).

Beamforming, which may also be referred to as spatial filtering, directional transmission, or directional reception, is a signal processing technique that may be used at a transmitting device or a receiving device (e.g., one or more of the base stations 102, UEs 104, etc.) to shape or steer an antenna beam (e.g., a transmit beam, a receive beam) along a spatial path between the transmitting device and the receiving device. Beamforming may be implemented based on combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A transmitting device and/or a receiving device (e.g., such as one or more of base stations 102 and/or UEs 104) may use beam sweeping techniques as part of beam forming operations. For example, a base station 102 (e.g., or other transmitting device) may use multiple antennas or antenna arrays (e.g., antenna panels) to conduct beamforming operations for directional communications with a UE 104 (e.g., or other receiving device). Some signals (e.g., synchronization signals, reference signals, beam selection signals, or other control signals) may be transmitted by base station 102 (or other transmitting device) multiple times in different directions. For example, the base station 102 may transmit a signal according to different beamforming weight sets associated with different directions of transmission. Transmissions in different beam directions may be used to identify (e.g., by a transmitting device, such as a base station 102, or by a receiving device, such as a UE 104) a beam direction for later transmission or reception by the base station 102.

Some signals, such as data signals associated with a particular receiving device, may be transmitted by a base station 102 in a single beam direction (e.g., a direction associated with the receiving device, such as a UE 104). In some examples, the beam direction associated with transmissions along a single beam direction may be determined based on a signal that was transmitted in one or more beam directions. For example, a UE 104 may receive one or more of the signals transmitted by the base station 102 in different directions and may report to the base station 104 an indication of the signal that the UE 104 received with a highest signal quality or an otherwise acceptable signal quality.

In some examples, transmissions by a device (e.g., by a base station 102 or a UE 104) may be performed using multiple beam directions, and the device may use a combination of digital precoding or radio frequency beamforming to generate a combined beam for transmission (e.g., from a base station 102 to a UE 104, from a transmitting device to a receiving device, etc.). The UE 104 may report feedback that indicates precoding weights for one or more beam directions, and the feedback may correspond to a configured number of beams across a system bandwidth or one or more sub-bands. The base station 102 may transmit a reference signal (e.g., a cell-specific reference signal (CRS), a channel state information reference signal (CSI-RS), etc.), which may be precoded or unprecoded. The UE 104 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 102, a UE 104 may employ similar techniques for transmitting signals multiple times in different directions (e.g., for identifying a beam direction for subsequent transmission or reception by the UE 104) or for transmitting a signal in a single direction (e.g., for transmitting data to a receiving device).

A receiving device (e.g., a UE 104) may try multiple receive configurations (e.g., directional listening) when receiving various signals from the base station 102, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may further include a WLAN AP 150 in communication with WLAN stations (STAs) 152 via communication links 154 in an unlicensed frequency spectrum (e.g., 5 Gigahertz (GHz)). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available. In some examples, the wireless communications system 100 can include devices (e.g., UEs, etc.) that communicate with one or more UEs 104, base stations 102, APs 150, etc., utilizing the ultra-wideband (UWB) spectrum. The UWB spectrum can range from 3.1 to 10.5 GHz.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE and/or 5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. The mmW base station 180 may be implemented in an aggregated or monolithic base station architecture, or alternatively, in a disaggregated base station architecture (e.g., including one or more of a CU, a DU, a RU, a Near-RT RIC, or a Non-RT RIC). Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW and/or near mmW radio frequency band have high path loss and a relatively short range. The mmW base station 180 and the UE 182 may utilize beamforming (e.g., transmit and/or receive) over an mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

In some aspects relating to 5G, the frequency spectrum in which wireless network nodes or entities (e.g., base stations 102/180, UEs 104/182) operate is divided into multiple frequency ranges, FR1 (e.g., from 450 to 6,000 Megahertz (MHz)), FR2 (e.g., from 24,250 to 52,600 MHZ), FR3 (e.g., above 52,600 MHz), and FR4 (e.g., between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (e.g., whether a PCell or an SCell) corresponds to a carrier frequency and/or component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). In carrier aggregation, the base stations 102 and/or the UEs 104 may use spectrum up to Y MHz (e.g., 5, 10, 15, 20, 100 MHz) bandwidth per carrier up to a total of Yx MHz (e.g., x component carriers) for transmission in each direction. The component carriers may or may not be adjacent to each other on the frequency spectrum. Allocation of carriers may be asymmetric with respect to the downlink and uplink (e.g., a greater or lesser quantity of carriers may be allocated for downlink than for uplink). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (e.g., 40 MHz), compared to that attained by a single 20 MHz carrier.

In order to operate on multiple carrier frequencies, a base station 102 and/or a UE 104 can be equipped with multiple receivers and/or transmitters. For example, a UE 104 may have two receivers, "Receiver 1" and "Receiver 2," where "Receiver 1" is a multi-band receiver that can be tuned to band (e.g., carrier frequency) 'X' or band 'Y,' and "Receiver 2" is a one-band receiver tunable to band 'Z' only. In this example, if the UE 104 is being served in band 'X,' band 'X' would be referred to as the PCell or the active carrier frequency, and "Receiver 1" would need to tune from band 'X' to band 'Y' (e.g., an SCell) in order to measure band 'Y' (and vice versa). In contrast, whether the UE 104 is being served in band 'X' or band 'Y,' because of the separate "Receiver 2," the UE 104 can measure band 'Z' without interrupting the service on band 'X' or band 'Y.'

The wireless communications system 100 may further include a UE 164 that may communicate with a macro cell base station 102 over a communication link 120 and/or the mmW base station 180 over an mmW communication link 184. For example, the macro cell base station 102 may support a PCell and one or more SCells for the UE 164 and the mmW base station 180 may support one or more SCells for the UE 164.

The wireless communications system 100 may further include one or more UEs, such as UE 190, that connects indirectly to one or more communication networks via one or more device-to-device (D2D) peer-to-peer (P2P) links (e.g., referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (e.g., through which UE 190 may indirectly obtain WLAN-based Internet connectivity). In an example, the D2D P2P links 192 and 194 may be supported with any well-known D2D RAT, such as LTE Direct (LTE-D), Wi-Fi Direct (Wi-Fi-D), Bluetooth®, and so on.

Figure 2:
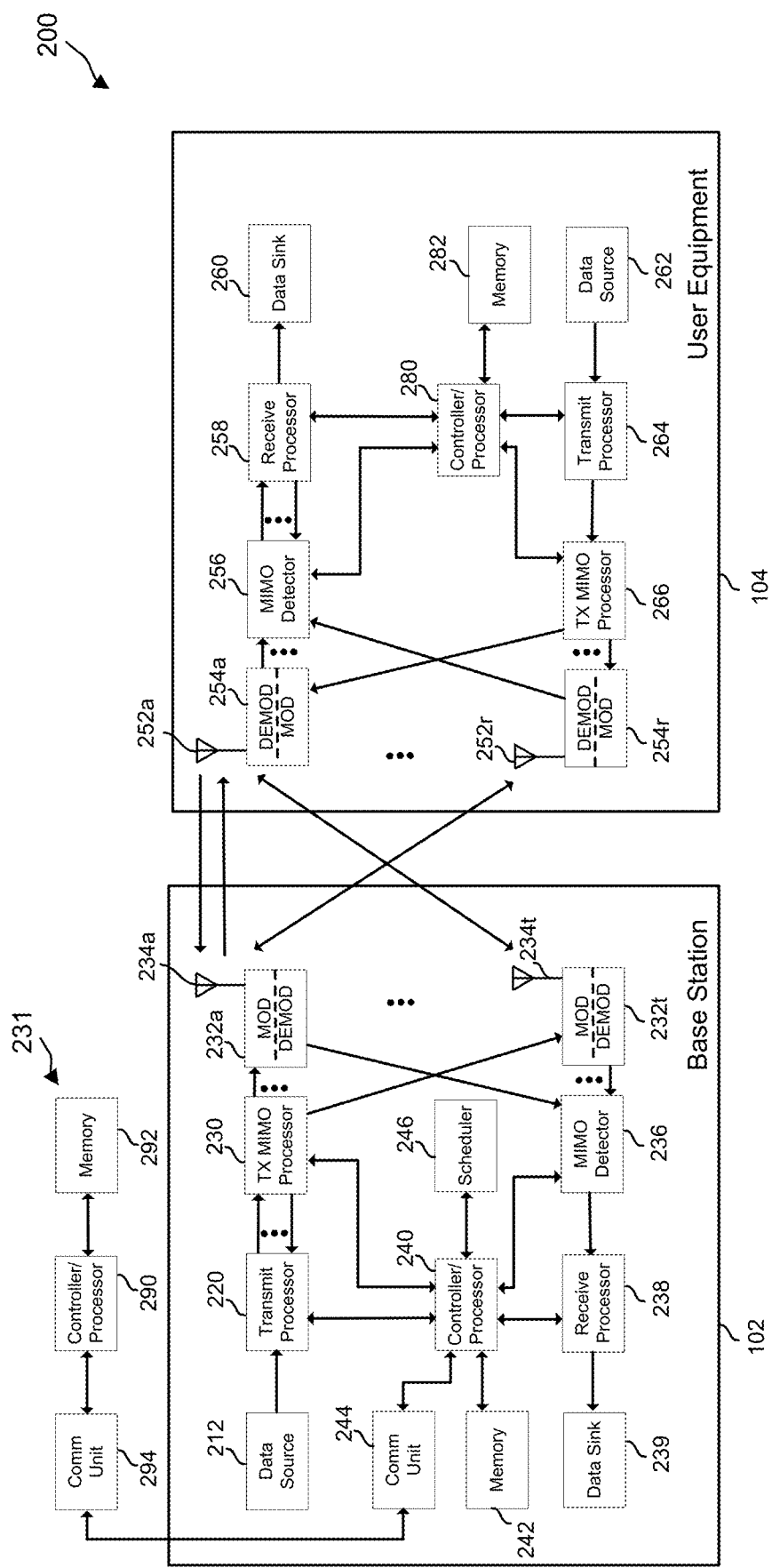
FIG. 2 is a diagram illustrating a design of a base station and a User Equipment (UE) device that enable transmission and processing of signals exchanged between the UE and the base station, in accordance with some examples.

FIG. 2 illustrates a block diagram of an example architecture 200 of a base station 102 and a UE 104 that enables transmission and processing of signals exchanged between the UE and the base station, in accordance with some aspects of the present disclosure. Example architecture 200 includes components of a base station 102 and a UE 104, which may be one of the base stations 102 and one of the UEs 104 illustrated in FIG. 1. Base station 102 may be equipped with T antennas 234a through 234t, and UE 104 may be equipped with R antennas 252a through 252r, where in general T≥1 and R≥1.

At base station 102, a transmit processor 220 may receive data from a data source 212 for one or more UEs, select one or more modulation and coding schemes (MCS) for each UE based on channel quality indicators (CQIs) received from the UE, process (e.g., encode and modulate) the data for each UE based on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. The modulators 232a through 232t are shown as a combined modulator-demodulator (MOD-DEMOD). In some cases, the modulators and demodulators can be separate components. Each modulator of the modulators 232a to 232t may process a respective output symbol stream (e.g., for an orthogonal frequency-division multiplexing (OFDM) scheme and/or the like) to obtain an output sample stream. Each modulator of the modulators 232a to 232t may further process (e.g., convert to analog, amplify, filter, and upconvert) the output sample stream to obtain a downlink signal. T downlink signals may be transmitted from modulators 232a to 232t via T antennas 234a through 234t, respectively. According to certain aspects described in more detail below, the synchronization signals can be generated with location encoding to convey additional information.

At UE 104, antennas 252a through 252r may receive the downlink signals from base station 102 and/or other base stations and may provide received signals to one or more demodulators (DEMODs) 254a through 254r, respectively. The demodulators 254a through 254r are shown as a combined modulator-demodulator (MOD-DEMOD). In some cases, the modulators and demodulators can be separate components. Each demodulator of the demodulators 254a through 254r may condition (e.g., filter, amplify, downconvert, and digitize) a received signal to obtain input samples. Each demodulator of the demodulators 254a through 254r may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 104 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like.

On the uplink, at UE 104, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals (e.g., based on a beta value or a set of beta values associated with the one or more reference signals). The symbols from transmit processor 264 may be precoded by a TX-MIMO processor 266, further processed by modulators 254a through 254r (e.g., for DFTs-OFDM, CP-OFDM, and/or the like), and transmitted to base station 102. At base station 102, the uplink signals from UE 104 and other UEs may be received by antennas 234a through 234t, processed by demodulators 232a through 232t, detected by a MIMO detector 236 (e.g., if applicable), and further processed by a receive processor 238 to obtain decoded data and control information sent by UE 104. Receive processor 238 may provide the decoded data to a data sink 239 and the decoded control information to controller (e.g., processor) 240. Base station 102 may include communication unit 244 and communicate to a network controller 231 via communication unit 244. Network controller 231 may include communication unit 294, controller/processor 290, and memory 292.

In some aspects, one or more components of UE 104 may be included in a housing. Controller 240 of base station 102, controller/processor 280 of UE 104, and/or any other component(s) of FIG. 2 may perform one or more techniques associated with implicit UCI beta value determination for NR.

Memories 242 and 282 may store data and program codes for the base station 102 and the UE 104, respectively. A scheduler 246 may schedule UEs for data transmission on the downlink, uplink, and/or sidelink.

In some aspects, deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS), or one or more units (or one or more components) performing base station functionality, may be implemented in an aggregated or disaggregated architecture. For example, a BS (e.g., such as a Node B (NB), evolved NB (eNB), NR BS, 5G NB, access point (AP), a transmit receive point (TRP), or a cell, etc.) may be implemented as an aggregated base station (e.g., also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (e.g., such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, e.g., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (e.g., such as the network configuration sponsored by the O-RAN Alliance)), or a virtualized radio access network (e.g., vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

Figure 3:
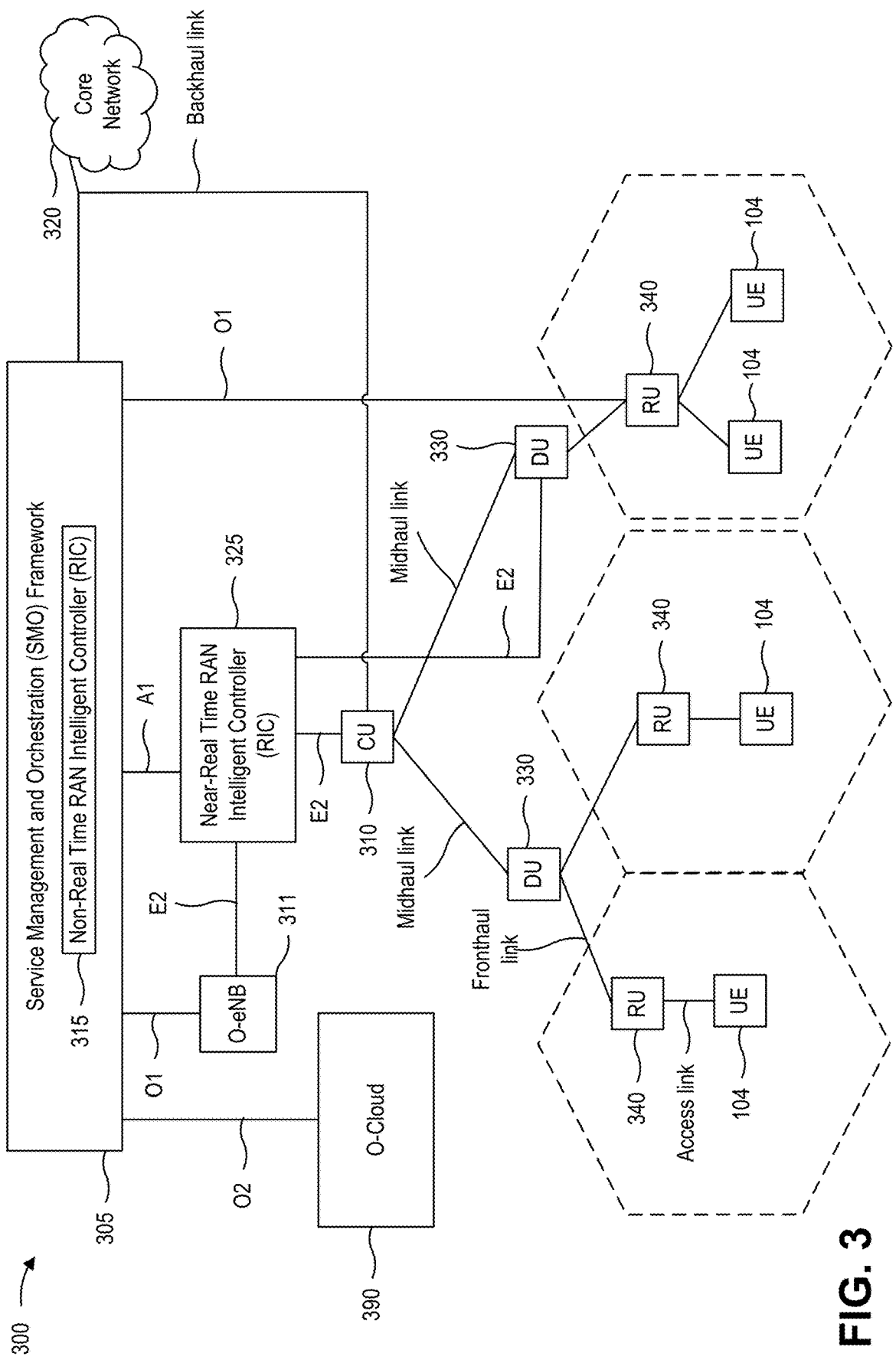
FIG. 3 is a diagram illustrating an example of a disaggregated base station, in accordance with some examples.

FIG. 3 is a diagram illustrating an example disaggregated base station 300 architecture. The disaggregated base station 300 architecture may include one or more central units (CUs) 310 that can communicate directly with a core network 320 via a backhaul link, or indirectly with the core network 320 through one or more disaggregated base station units (e.g., such as a Near-Real Time (Near-RT) RAN Intelligent Controller (RIC) 325 via an E2 link, or a Non-Real Time (Non-RT) RIC 315 associated with a Service Management and Orchestration (SMO) Framework 305, or both). A CU 310 may communicate with one or more distributed units (DUs) 330 via respective midhaul links, such as an F1 interface. The DUs 330 may communicate with one or more radio units (RUS) 340 via respective fronthaul links. The RUs 340 may communicate with respective UEs 104 via one or more radio frequency (RF) access links. In some implementations, the UE 104 may be simultaneously served by multiple RUs 340.

Each of the units (e.g., the CUS 310, the DUs 330, the RUs 340, as well as the Near-RT RICs 325, the Non-RT RICs 315, and the SMO Framework 305) illustrated in FIG. 3 and/or described herein may include one or more interfaces or be coupled to one or more interfaces configured to receive or transmit signals, data, or information (e.g., collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (e.g., such as a radio frequency (RF) transceiver), configured to receive or transmit signals, or both, over a wireless transmission medium to one or more of the other units.

In some aspects, the CU 310 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 310. The CU 310 may be configured to handle user plane functionality (e.g., Central Unit-User Plane (CU-UP)), control plane functionality (e.g., Central Unit-Control Plane (CU-CP)), or a combination thereof. In some implementations, the CU 310 can be logically split into one or more CU-UP units and one or more CU-CP units. The CU-UP unit can communicate bidirectionally with the CU-CP unit via an interface, such as the E1 interface when implemented in an O-RAN configuration. The CU 310 can be implemented to communicate with the DU 330, as necessary, for network control and signaling.

The DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers (e.g., such as modules for forward error correction (FEC) encoding and decoding, scrambling, modulation and demodulation, or the like) depending on a functional split, such as those defined by the 3rd Generation Partnership Project (3GPP). In some aspects, the DU 330 may further host one or more low PHY layers. Each layer (or module) can be implemented with an interface configured to communicate signals with other layers (and modules) hosted by the DU 330, or with the control functions hosted by the CU 310.

Lower-layer functionality can be implemented by one or more RUs 340. In some deployments, an RU 340, controlled by a DU 330, may correspond to a logical node that hosts RF processing functions, or low-PHY layer functions (e.g., such as performing fast Fourier transform (FFT), inverse FFT (iFFT), digital beamforming, physical random-access channel (PRACH) extraction and filtering, or the like), or both, based on the functional split, such as a lower layer functional split. In such an architecture, the RU(s) 340 can be implemented to handle over the air (OTA) communication with one or more UEs 104. In some implementations, real-time and non-real-time aspects of control and user plane communication with the RU(s) 340 can be controlled by the corresponding DU 330. In some scenarios, this configuration can enable the DU(s) 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements which may be managed via an operations and maintenance interface (e.g., such as an O1 interface). For virtualized network elements, the SMO Framework 305 may be configured to interact with a cloud computing platform (e.g., such as an open cloud (O-Cloud) 390) to perform network element life cycle management (e.g., such as to instantiate virtualized network elements) via a cloud computing platform interface (e.g., such as an O2 interface). Such virtualized network elements can include, but are not limited to, CUs 310, DUs 330, RUS 340, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with one or more RUs 340 via an O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (e.g., such as via an A1 interface) the Near-RT RIC 325. The Near-RT RIC 325 may be configured to include a logical function that enables near-real-time control and optimization of RAN elements and resources via data collection and actions over an interface (e.g., such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (e.g., such as reconfiguration via O1) or via creation of RAN management policies (e.g., such as A1 policies).

Figure 4:
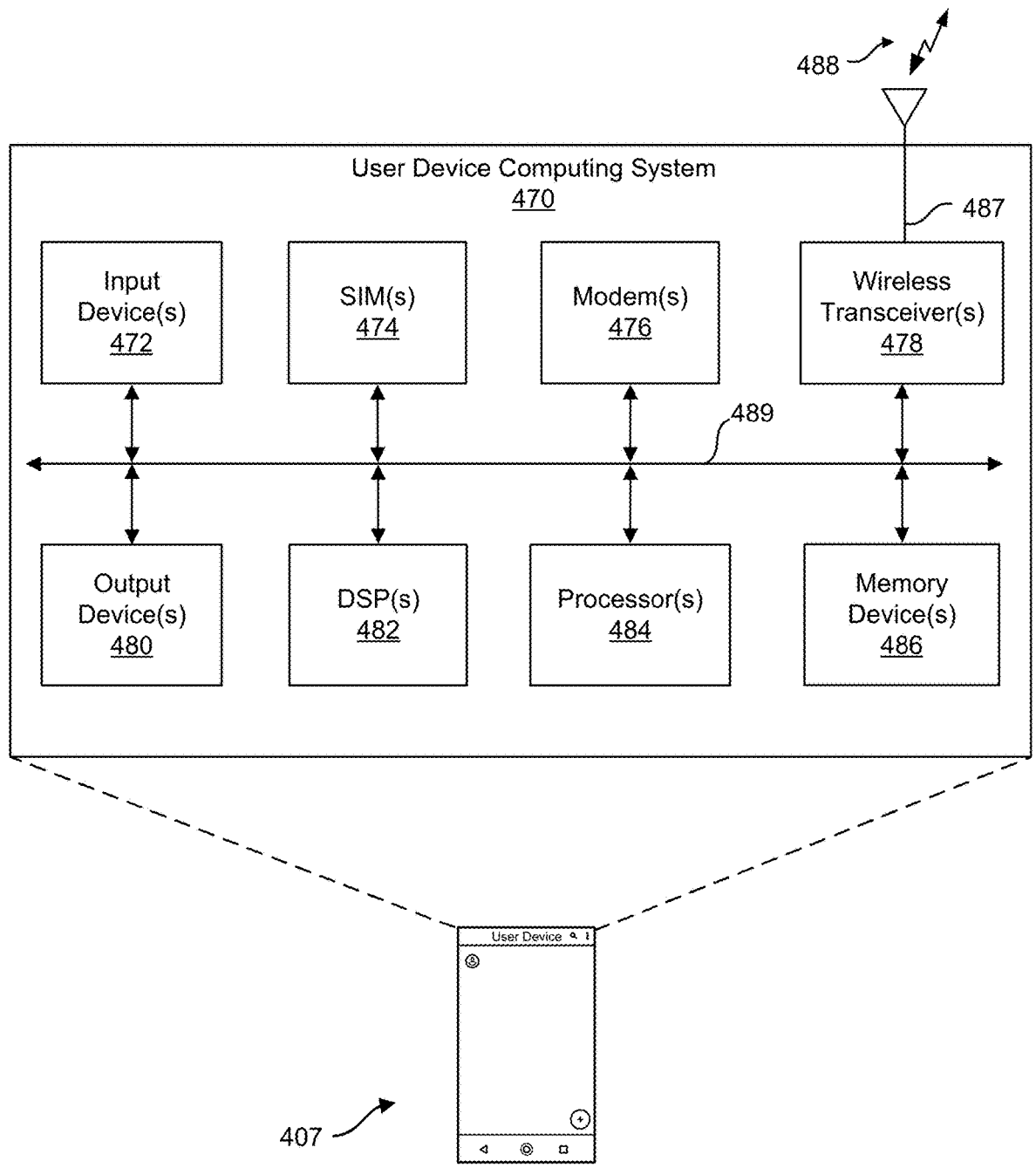
FIG. 4 is a block diagram illustrating components of a user equipment (UE), in accordance with some examples.

FIG. 4 illustrates an example of a computing system 470 of a wireless device 407. The wireless device 407 may include a client device such as a UE (e.g., UE 104, UE 152, UE 190) or other type of device (e.g., a station (STA) configured to communication using a Wi-Fi interface) that may be used by an end-user. For example, the wireless device 407 may include a mobile phone, router, tablet computer, laptop computer, tracking device, wearable device (e.g., a smart watch, glasses, an extended reality (XR) device such as a virtual reality (VR), augmented reality (AR), or mixed reality (MR) device, etc.), Internet of Things (IoT) device, a vehicle, an aircraft, and/or another device that is configured to communicate over a wireless communications network. The computing system 470 includes software and hardware components that may be electrically or communicatively coupled via a bus 489 (e.g., or may otherwise be in communication, as appropriate). For example, the computing system 470 includes one or more processors 484. The one or more processors 484 may include one or more CPUs, ASICs, FPGAS, APs, GPUs, VPUs, NSPs, microcontrollers, dedicated hardware, any combination thereof, and/or other processing device or system. The bus 489 may be used by the one or more processors 484 to communicate between cores and/or with the one or more memory devices 486.

The computing system 470 may also include one or more memory devices 486, one or more digital signal processors (DSPs) 482, one or more SIMs 474, one or more modems 476, one or more wireless transceivers 478, an antenna 487, one or more input devices 472 (e.g., a camera, a mouse, a keyboard, a touch sensitive screen, a touch pad, a keypad, a microphone, and/or the like), and one or more output devices 480 (e.g., a display, a speaker, a printer, and/or the like).

In some aspects, computing system 470 may include one or more radio frequency (RF) interfaces configured to transmit and/or receive RF signals. In some examples, an RF interface may include components such as modem(s) 476, wireless transceiver(s) 478, and/or antennas 487. The one or more wireless transceivers 478 may transmit and receive wireless signals (e.g., signal 488) via antenna 487 from one or more other devices, such as other wireless devices, network devices (e.g., base stations such as eNBs and/or gNBs, Wi-Fi access points (APs) such as routers, range extenders or the like, etc.), cloud networks, and/or the like. In some examples, the computing system 470 may include multiple antennas or an antenna array that may facilitate simultaneous transmit and receive functionality. Antenna 487 may be an omnidirectional antenna such that radio frequency (RF) signals may be received from and transmitted in all directions. The wireless signal 488 may be transmitted via a wireless network. The wireless network may be any wireless network, such as a cellular or telecommunications network (e.g., 3G, 4G, 5G, etc.), wireless local area network (e.g., a Wi-Fi network), a Bluetooth™ network, and/or other network.

In some examples, the wireless signal 488 may be transmitted directly to other wireless devices using sidelink communications (e.g., using a PC5 interface, using a DSRC interface, etc.). Wireless transceivers 478 may be configured to transmit RF signals for performing sidelink communications via antenna 487 in accordance with one or more transmit power parameters that may be associated with one or more regulation modes. Wireless transceivers 478 may also be configured to receive sidelink communication signals having different signal parameters from other wireless devices.

In some examples, the one or more wireless transceivers 478 may include an RF front end including one or more components, such as an amplifier, a mixer (e.g., also referred to as a signal multiplier) for signal down conversion, a frequency synthesizer (e.g., also referred to as an oscillator) that provides signals to the mixer, a baseband filter, an analog-to-digital converter (ADC), one or more power amplifiers, among other components. The RF front-end may generally handle selection and conversion of the wireless signals 488 into a baseband or intermediate frequency and may convert the RF signals to the digital domain.

In some cases, the computing system 470 may include a coding-decoding device (or CODEC) configured to encode and/or decode data transmitted and/or received using the one or more wireless transceivers 478. In some cases, the computing system 470 may include an encryption-decryption device or component configured to encrypt and/or decrypt data (e.g., according to the AES and/or DES standard) transmitted and/or received by the one or more wireless transceivers 478.

The one or more SIMs 474 may each securely store an international mobile subscriber identity (IMSI) number and related key assigned to the user of the wireless device 407. The IMSI and key may be used to identify and authenticate the subscriber when accessing a network provided by a network service provider or operator associated with the one or more SIMs 474. The one or more modems 476 may modulate one or more signals to encode information for transmission using the one or more wireless transceivers 478. The one or more modems 476 may also demodulate signals received by the one or more wireless transceivers 478 in order to decode the transmitted information. In some examples, the one or more modems 476 may include a Wi-Fi modem, a 4G (or LTE) modem, a 5G (or NR) modem, and/or other types of modems. The one or more modems 476 and the one or more wireless transceivers 478 may be used for communicating data for the one or more SIMs 474.

The computing system 470 may also include (and/or be in communication with) one or more non-transitory machine-readable storage media or storage devices (e.g., one or more memory devices 486), which may include, without limitation, local and/or network accessible storage, a disk drive, a drive array, an optical storage device, a solid-state storage device such as a RAM and/or a ROM, which may be programmable, flash-updateable, and/or the like. Such storage devices may be configured to implement any appropriate data storage, including without limitation, various file systems, database structures, and/or the like.

In various aspects, functions may be stored as one or more computer-program products (e.g., instructions or code) in memory device(s) 486 and executed by the one or more processor(s) 484 and/or the one or more DSPs 482. The computing system 470 may also include software elements (e.g., located within the one or more memory devices 486), including, for example, an operating system, device drivers, executable libraries, and/or other code, such as one or more application programs, which may comprise computer programs implementing the functions provided by various aspects, and/or may be designed to implement methods and/or configure systems, as described herein.

As noted previously, the systems and techniques described herein can be used to perform malicious call attack detection and/or mitigation for MT calls (e.g., silent MT call attempts) received by a UE (e.g., also referred to herein as a "victim UE"). In some cases, the systems and techniques can be implemented by a UE that receives one or more MT call attempts (e.g., the victim UE). Each MT call attempt can be associated with a corresponding paging message transmitted from the network (e.g., a network entity, base station, gNB, etc., of a cellular network associated with the victim UE), where the paging message is indicative of and/or alerts the victim UE of the incoming MT call attempt.

A silent MT call attack can correspond to multiple MT call attempts being initiated for a victim UE within a relatively short period of time. Each MT call attempt can be a silent MT call attempt, where the MT call attempt is terminated prior to call acceptance and/or prior to the call being active. In one illustrative example, a silent MT call attempt can be terminated (e.g., by an attacker initiating the MT call to the victim UE) before the call setup procedure reaches the alerting step (e.g., before the victim UE rings or alerts a user of the incoming call). In some aspects, a silent MT call attempt can be terminated after the victim UE performs alerting, but before the call acceptance and/or call active steps of the call setup procedure.

Figure 5A:
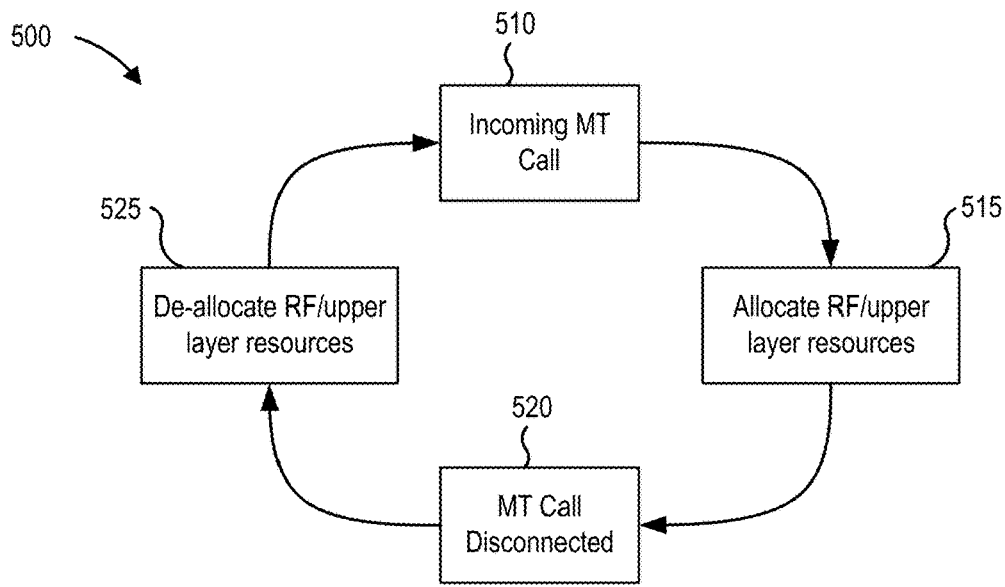
FIG. 5A is a diagram illustrating an example of a silent Mobile Terminated (MT) call attack in a standalone call session, in accordance with some examples.
Figure 5B:
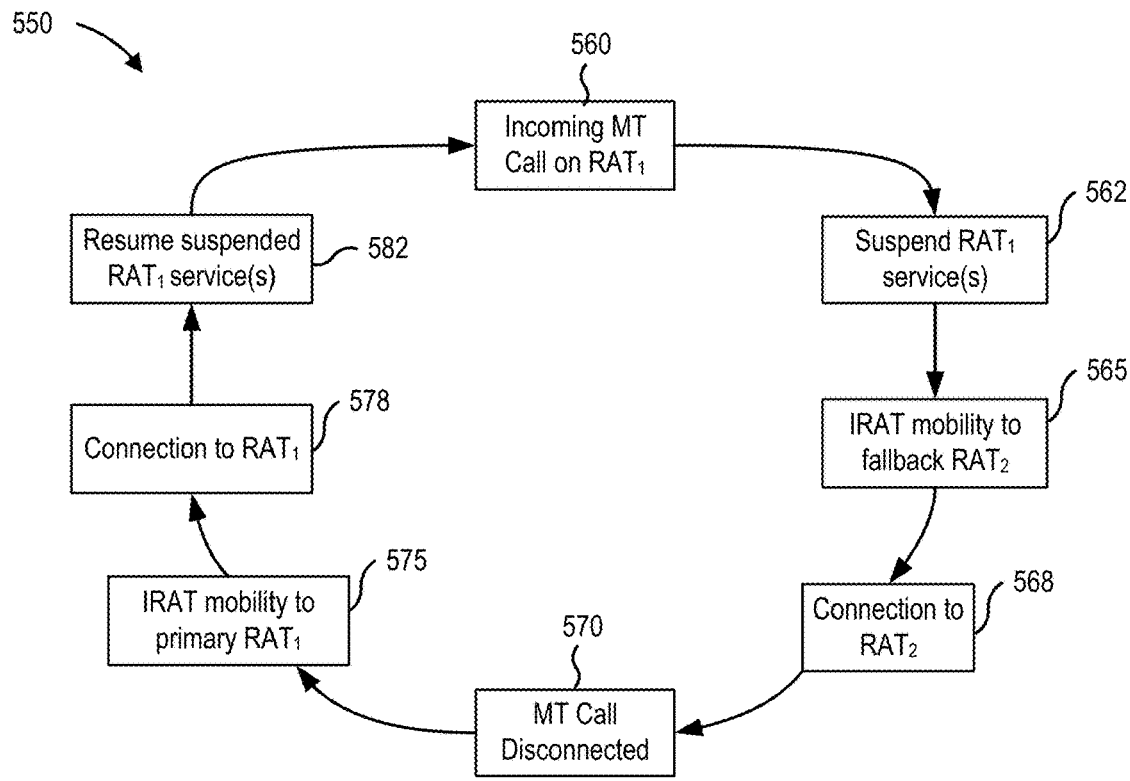
FIG. 5B is a diagram illustrating an example of a silent MT call attack in an inter-radio access technology (IRAT) mobility call session, in accordance with some examples.

A silent MT call attack can be associated with service degradation for a victim UE and/or can be associated with increased power consumption (e.g., increased battery drain or usage) for the victim UE. For example, FIG. 5A is a diagram illustrating an example of a silent MT call attack 500 in a standalone (e.g., VONR, VOLTE, etc.) call session, in accordance with some examples. FIG. 5B is a diagram illustrating an example of a silent MT call attack 550 in an IRAT mobility (e.g., NR to LTE, LTE to WCDMA/GERAN, etc.) call session, in accordance with some examples.

For instance, in the example silent MT call attack 500 in the standalone call session of FIG. 5A, a UE (e.g., victim UE) can receive an incoming MT call 510 (e.g., an MT call attempt). The MT call attempt 510 can be a silent MT call, and may be initiated as a normal MT call, where the calling party dials the recipient's number. In the silent MT call attack 500, the calling party can be a malicious user or attacker performing the silent MT call attack 500. The recipient of the MT call attempt 510 is the victim UE.

Based on the incoming MT call attempt 510, the victim UE receives a corresponding paging request from the network and for the MT call attempt 510. Based on receiving the page and/or performing one or more additional steps of the call setup procedure, the victim UE may allocate RF/upper layer resources at block 515. For instance, the incoming MT call 510 may cause the victim UE to initiate a Random Access Channel (RACH) procedure to establish uplink synchronization with a network entity (e.g., base station, gNB, etc.) and request an allocation of uplink resources. In some cases, the incoming MT call 510 may additionally cause the victim UE to transmit a connection setup request to the network entity (e.g., using the allocated uplink resources) for an allocation of downlink resources.

In the silent MT call attack 500 of FIG. 5A, the incoming MT call attempt 510 can be disconnected at block 520. In some aspects, the incoming MT call is disconnected at block 520 before the victim UE performs alerting (e.g., ringing) indicative of the incoming MT call 510.

Based on the MT call disconnection at block 520, the victim UE may terminate the in-progress call setup procedure that was initiated based on previously receiving the incoming MT call attempt at block 510. For instance, the victim UE at block 525 may de-allocate any RF or upper layer network resources, bearers, etc., that were allocated during call setup (e.g., performed at block 515) for the incoming MT call attempt 510. If the call setup procedure progressed to the point of allocating uplink and downlink resources prior to the MT call disconnection at block 520, the silent MT call attack 500 can cause the victim UE at block 525 to perform deallocation for both the uplink and downlink resources that were allocated for the MT call attempt 510. If the call setup procedure progressed to the point of allocating uplink resources but not downlink resources prior to the MT call disconnection at block 520, the silent MT call attack 500 can cause the victim UE at block 525 to perform deallocation for the uplink resources that were allocated for the MT call attempt 510.

As noted previously, in a silent MT call attack (e.g., such as the example silent MT call attack 500 of FIG. 5A), the attacker (e.g., the calling party) may initiate successive MT call attempts 510 in a short period of time. For instance, an attacker may initiate a second MT call attempt 510 after a first MT call attempt is disconnected at block 520 (e.g., a silent MT call attack can include first and second silent MT calls initiated back-to-back to the same victim UE, etc.). In some cases, a successive MT call attempt 510 can be initiated while the victim UE is still performing the RF resource de-allocation of block 525. In some examples, a successive MT call attempt 510 can be initiated shortly after the victim UE completes the RF resource de-allocation of block 525, etc.

The example silent MT call attack 500 of FIG. 5A can correspond to an example where the incoming MT call attempt(s) 510 are received in a standalone call session. For example, the incoming MT call attempt(s) 510 may be VONR calls, VOLTE calls, etc.

In some aspects, a silent MT call attack may cause greater adverse effects at a victim UE in examples where the incoming MT call attempts trigger or require inter-RAT mobility to be performed at the victim UE in order to perform the call setup procedure for the incoming MT call attempt.

For instance, the example silent MT call attack 550 of FIG. 5B can correspond to examples where an incoming MT call request 560 is received by a victim UE while connected to a primary $RAT_1$ (e.g., or a particular cell thereof) that does not support voice call services. Based on receiving the incoming MT call request 560 on primary $RAT_1$, the silent MT call attack 550 causes the victim UE to suspend currently running $RAT_1$ services at block 562, and perform IRAT mobility to a fallback $RAT_2$ that does support voice call services for call setup of the incoming MT call request 560.

For instance, the primary $RAT_1$ may be 5G NR, and the fallback $RAT_2$ may be 4G LTE. For instance, the victim UE may receive the incoming MT call request 560 while in an NR cell that does not support VONR and cannot be used to perform call setup for the MT call request 560. In response, the victim UE may perform an EPS fallback (EPSFB) to LTE during the MT call 560 to continue voice services. In another example, the primary $RAT_1$ may be 4G LTE and the fallback $RAT_2$ may be 3G WCDMA or 2G GERAN. Fallback from 4G LTE to legacy RATs such as 3G WCDMA or 2G GERAN can be performed based on circuit-switched fallback (CSFB). In another example, the primary $RAT_1$ may be 3G WCDMA and the fallback $RAT_2$ may be 2G GERAN, etc.

In some aspects, the incoming MT call request 560 of FIG. 5B can be the same as or similar to the incoming MT call request 510 of FIG. 5A. In one illustrative example, the incoming MT call request 560 of FIG. 5B and the incoming MT call request 510 of FIG. 5A are the same, with the silent MT call attack corresponding to the example attack 500 of FIG. 5A in scenarios where the victim UE can perform standalone call setup for the incoming MT call request, or corresponding to the example attack 550 of FIG. 5B in scenarios where the victim UE must perform IRAT mobility for call setup for the incoming MT call request.

In some examples, the suspension of the primary $RAT_1$ services at block 562 can correspond to performance degradation at the victim UE. For instance, if the victim UE is utilizing a 5G NR data connection at the time of the incoming MT call request 560, at block 562 the 5G NR data connection services will be suspended as the victim UE prepares to perform IRAT mobility for call setup for the incoming MT call request 560.

At block 565, after suspending the primary $RAT_1$ services, the victim UE performs IRAT mobility to the fallback $RAT_2$ (e.g., 5G NR to 4G LTE; 4G LTE to 3G CDMA or 2G GERAN; etc.). IRAT mobility can be a relatively energy-intensive process for the victim UE, and performing the IRAT mobility of block 565 can cause depletion of a battery or other energy source associated with the victim UE.

At block 568, the victim UE completes the IRAT mobility initiated at block 565, and establishes a connection to the fallback $RAT_2$.

At block 570, the attacker may disconnect the MT call request 560. The MT call disconnection of block 570 of FIG. 5B can be the same as or similar to the MT call disconnection of block 520 of FIG. 5A.

Based on the MT call being disconnected at block 570, the victim UE may abort the IRAT mobility to the fallback $RAT_2$ and initiate a recovery back to the primary $RAT_1$. For instance, at block 575, the victim UE can initiate IRAT mobility to recover back to the primary $RAT_1$, based on determining the MT call disconnection at block 570. The IRAT mobility to recover back from $RAT_2$ to $RAT_1$ at block 575 can be the same as or similar to the IRAT mobility to fallback from $RAT_1$ to $RAT_2$ at block 565.

At block 578, the IRAT mobility to recover back from $RAT_2$ to $RAT_1$ can be completed, and the victim UE completes connection establishment to the primary $RAT_1$.

At block 582, the victim UE can resume the suspended $RAT_1$ services that were previously suspended at block 562 in preparation for the IRAT fallback mobility triggered by the incoming MT call request 560.

The victim UE operations performed during the silent MT call attack 550 at blocks 562, 565, 568, 575, 578, and/or 582 may each be associated with a corresponding energy usage (e.g., battery power consumption) at the victim UE. Each cycle or iteration of the silent MT call attack 550 (e.g., each instance of an incoming silent MT call attempt 560 within a same or similar time period) can cause battery depletion of the victim UE, in an amount approximately equal to the energy expenditure required for the victim UE to perform the operations of blocks 562-582.

Additionally, each of the victim UE operations performed during the silent MT call attack 550 (e.g., blocks 562, 565, 568, 575, and/or 578) may each be associated with a corresponding time duration (e.g., processing time, time to completion, etc.). During the time of the silent MT call attack 550 (e.g., between blocks 560 and blocks 582), the victim UE may experience a temporary loss of network connectivity, such as during the IRAT mobility of blocks 565 and 575. The victim UE may experience a temporary loss of primary $RAT_1$ service connectivity between blocks 562 to 585. Additionally, the victim UE may be blocked from placing or originating outgoing MO calls during an iteration or cycle of the silent MT call attack 550 (e.g., based on the victim UE modem being configured to give priority to MT calls over MO calls). Legitimate MT call attempts (e.g., MT call attempts other than the malicious MT call attempt(s) 560) to the victim UE during a cycle or iteration of the silent MT call attack 550 may be blocked or prevented, with the legitimate calling party receiving a busy signal during the silent MT call attack 550 on the victim UE.

There is a need for systems and techniques that can be used to detect and/or mitigate silent MT calls for victim UEs. For instance, in one illustrative example of a silent MT call attack in a standalone call session (e.g., such as in the example attack 500 of FIG. 5A), a victim UE connected to a 4G LTE network and using VOLTE can experience 7% or greater battery drain in approximately 20 minutes of the standalone call session silent MT call attack, where legitimate callers receive a busy response when trying to call the victim UE during the silent MT call attack (e.g., where the victim UE is engaged in RF resource allocation and deallocation for each silent MT call request 510 of the attack).

In another illustrative example of an IRAT mobility call session (e.g., such as in the example attack 550 of FIG. 5B), a victim UE connected to a 4G LTE network with VOLTE disabled can be forced to use its modem to repeatedly switch between the 4G LTE primary $RAT_1$ and a GSM/WCDMA fallback or legacy $RAT_2$ by the silent MT call attack 550 of FIG. 5B. In some examples, the user of the victim UE is not notified about the incoming MT calls 560, because the CSFB and EPSFB call of an IRAT mobility silent MT call attack (e.g., example attack 550) may take more time to establish than a standalone call without IRAT mobility. Based on the increased establishment time of an IRAT mobility call, an attacker or malicious user acting as the call originator of the silent MT call attack 550 has time to perform the MT call request disconnection 570 before the ringing or alerting stage of the call setup procedure being triggered for (e.g., performed by) the victim UE in the silent MT call attack 550. In some aspects, an example silent MT call attack with IRAT mobility from 4G to GSM/WCDMA can be associated with a 2% battery drain in 10 minutes, even when the victim UE is configured in a battery-saving (e.g., power-saving) mode. In some aspects, legitimate callers to the victim UE receive a busy signal when attempting to place an MO call to the victim UE (e.g., the corresponding legitimate MT calls to the victim UE from the legitimate call originating parties experience a denial of service (DOS). In some cases, the IRAT mobility silent MT call attack 550 causes the victim UE to remain in a downgraded network connectivity mode (e.g., using the fallback or legacy $RAT_2$, such as GSM/WCDMA) for prolonged periods of time, which may impact the user of the victim UE as a degraded user experience and security POV. A same or similar scenario may occur for a silent MT call attack 550 associated with NR to LTE IRAT due to EPSFB call.

Figure 6:
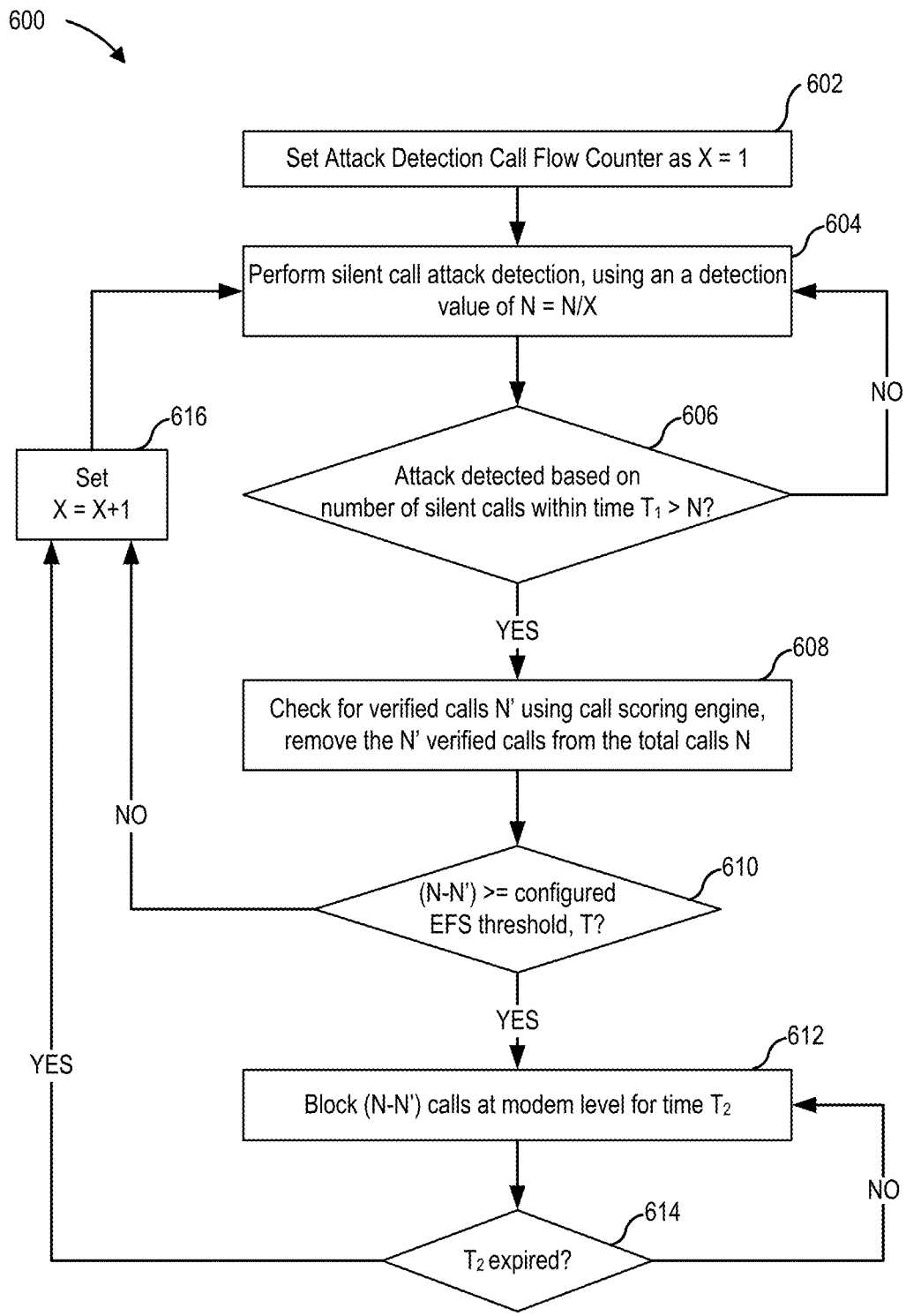
FIG. 6 is a flow diagram illustrating an example of a process for silent MT call attack detection and mitigation, in accordance with some examples.

FIG. 6 is a flow diagram illustrating an example of a process 600 for silent MT call attack detection and mitigation, in accordance with some examples. In one illustrative example, the silent MT call attack detection and mitigation process 600 can be implemented and/or performed by a victim UE, such as a victim UE associated with the standalone call session silent MT call attack 500 of FIG. 5A, a victim UE associated with the IRAT mobility call session silent MT call attack 550 of FIG. 5B, etc.).

For instance, the process 600 can be implemented based on a sliding time window for detecting a silent MT call attack. In some aspects, the sliding time window can use a length (e.g., time interval) given as $T_1$ seconds. For example, a victim UE can perform silent MT call attack detection by analyzing the last $T_1$ seconds of calling activity at the victim UE.

At block 604, the process 600 can include performing silent MT call attack detection, based on the sliding time window $T_1$ and a detection threshold value N. For instance, a UE can determine if the number of silent MT calls received within time $T_1$ is greater than the detection threshold N.

In some aspects, the UE can be configured to determine if the number of silent MT calls received within the sliding time window $T_1$ is greater than N/X. For example, a victim UE can perform initialization for the silent MT call attack detection and mitigation process 600 at block 602, prior to first performing block 604.

At block 602, an attack detection call flow counter, X, can be initialized to X=1. The attack detection call flow counter X can be used to track the number of times that the victim UE has iterated through the process 600. For instance, a first iteration of the process 600 can be performed when the victim UE first performs the silent MT call detection of block 604. In the first iteration, the call flow counter X=1, and at block 604 the UE compares the number of silent MT calls received within the sliding time window $T_1$ to N/X=N/1=N.

In a second iteration through the process 600, the call flow counter X is incremented at block 616 (e.g., before the process returns to perform the silent MT call detection of block 604 for a second time). In the second iteration, the call flow counter X=2, and the silent MT call detection of block 604 for the second iteration is based on comparing the number of silent MT calls received within the sliding time window $T_1$ to N/X=N/2. Based on incrementing the call flow counter X for subsequent iterations of the silent MT call detection and mitigation process 600, the threshold level of silent MT calls required to trigger the detection of block 604 is reduced through the subsequent iterations. Reducing the threshold value for the silent MT call detection of block 604 can be associated with a quicker mitigation of an ongoing silent MT call attack, as will be described below.

In one illustrative example, at block 606, the process 600 includes comparing the number of silent MT calls received within time $T_1$ to the threshold detection value N/X (e.g., using the current value of the call flow counter, X, for the current iteration of process 600). Based on a determination that the number of silent MT calls received within the sliding time window $T_1$ is not greater than the detection threshold N/X, the process 600 can return to block 604 and continue performing silent MT call detection. In some aspects, the call flow counter, X, is not incremented when the process 600 returns from block 606 to block 604.

Based on a determination that the number of silent MT calls received within the sliding time window $T_1$ is greater than the detection threshold N/X, the process 600 can proceed to block 608. In one illustrative example, block 608 can correspond to a first mitigation step. For instance, the silent MT call attack detection and mitigation process 600 can include at least one silent MT call detection step (e.g., block 604 and/or block 606), a first silent MT call attack mitigation step (e.g., block 608), and a second silent MT call attack mitigation step (e.g., block 612).

In the first silent MT call attack mitigation step of block 608, the process 600 can include determining a number of legitimate calls, N', that are included in the overall number of calls N. In some aspects, the legitimate calls can be verified calls (e.g., verified MT calls included in the N MT calls detected within the current sliding time window $T_1$). For instance, block 608 can include using a call scoring engine to determine or identify a number (e.g., N') of legitimate (e.g., verified) MT calls received within the sliding time window $T_1$. The subset of MT calls that are verified by the call scoring engine (e.g., the quantity N' calls) can be removed from the total calls N.

For instance, (N-N') non-verified MT calls may remain after block 608. Each respective MT call of the (N-N') calls can be a non-verified MT, determined based on corresponding analysis of the call using the call scoring engine.

At block 610, the process 600 can include comparing the number of non-verified MT calls, (N-N'), to a configured threshold value, T. Mitigation can be performed for a remaining (N-N') MT call attempts that may be malicious and/or associated with a silent MT call attack. In some aspects, mitigation can be performed based on a determination that the number of (N-N') MT call attempts is greater than a threshold. For instance, the threshold can be an EFS configured threshold.

Based on a determination that the number of non-verified MT call attempts, (N-N'), is less than the EFS-configured threshold, T, the process 600 can return from block 610 to the silent MT call detection step of block 604. In some aspects, the call flow counter X may be incremented prior to returning from block 610 to block 604. In another example, the call flow counter X is not incremented when returning from block 610 to block 604 (e.g., the call flow counter value X may be maintained when returning to block 604 based on (N-N')<T at block 610).

Based on a determination that the number of non-verified MT call attempts, (N-N'), is greater than or equal to the EFS-configured threshold, T, the process 600 can proceed from block 610 to the second mitigation step of block 612.

At block 612, the process 600 can include performing a second mitigation step for the detected silent MT call attack. For instance, mitigation can be performed for the (N-N') non-verified MT call attempts determined in block 608 (e.g., using the call scoring engine). In one illustrative example, mitigation can include performing modem-level blocking of a cellular number or calling identity associated with the (N-N') non-verified MT call attempts. Based on the modem-level blocking of the malicious MT call attempts (e.g., the (N-N') non-verified MT call attempts), subsequent MT call attempts initiated to the victim UE by a blocked calling party may be aborted at the paging step of the MT call setup procedure. For instance, an MT call paging message can be received by the victim UE, and the call setup procedure aborted based on determining from the page that the caller is included in the modem-level blocking applied during the mitigation of block 612.

In some aspects, the cellular number and/or calling identity associated with a malicious MT call attempt (e.g., associated with one of the (N-N') MT call attempts) can be blocked at the modem level for a time $T_2$. In some cases, the modem-level blocking can be removed at the expiration of the time $T_2$. The time $T_2$ can be measured from the respective time when modem-level blocking was initiated for each blocked cellular number or calling identity.

For instance, at block 614, the process 600 can include implementing a timer value $T_2$ for the modem-level blocking applied at block 612. For instance, a timer can be started concurrently with the implementing of the modem-level blocking of block 612. At block 614, the elapsed time measured by the timer can be compared against the threshold timer value $T_2$. While the elapsed time measured by the timer is less than the threshold timer value $T_2$, the process 600 can maintain the modem-level blocking applied in block 612 (e.g., the 'No' branch returning from block 614 to block 612). Based on the elapsed time measured by the timer being greater than or equal to the threshold timer value $T_2$, the process 600 can remove the modem-level blocking applied in block 612 and may proceed (e.g., return) to block 604.

In one illustrative example, the process 600 can proceed from block 614 to block 616 based on a determination that the elapsed time measured by the timer is greater than or equal to the timer threshold value $T_2$. At block 616, the process 600 can include incrementing the call flow counter X, as X=X+1, to reduce the detection time at block 604 for the next iteration of the MT silent call attack detection and mitigation process 600.

In some aspects, history information can be maintained (e.g., by the victim UE implementing the process 600 of FIG. 6) for numbers or calling identities that were previously blocked in a silent MT call attack mitigation. For instance, each number or calling identity that is blocked at block 612 of process 600 can be stored and/or identified as a previously-blocked number.

In one illustrative example, after the $T_2$ timer expiry at block 614, subsequent MT call attempts from a previously blocked number or calling identity can trigger immediate mitigation. For instance, the MT call detection of block 604 may include a comparison between the number or calling identity associated with each incoming MT call attempt during the sliding time window $T_1$ with a list of previously blocked numbers or calling identities. An incoming MT call attempt that matches with a previously blocked number or calling identity can immediately be mitigated, for instance by applying the modem-level blocking of block 612. In some aspects, repeated MT call attempts from previously blocked callers can be mitigated with a scaling threshold timer value for $T_2$. For instance, the block duration can increase for subsequent times where an MT call attempt is received by the victim UE from a previously blocked caller. In some examples, the $T_2$ modem-level blocking duration can scale by a factor of two for successive silent MT call attack attempts from the same caller (e.g., the first time mitigation is applied for a calling identity, the modem-level blocking can be maintained for time $T_2$; the second time mitigation is applied for a calling identity, the mitigation can be applied immediately upon receiving the page and the modem-level blocking can be maintained for time $2*T_2$; the third time mitigation is applied can be for time $4*T_2$; etc.).

In some aspects, a third timer value $T_3$ can be implemented as a random timer value for resetting all mitigation applied by process 600. For instance, the modem-level blocking can be cleared upon the expiration of the random timer $T_3$ and the process 600 can begin again from block 602. The random timer $T_3$ for resetting the mitigation of process 600 can be used to prevent sophisticated attackers from determining the values of timer $T_1$, timer $T_2$, and/or the detection threshold N that are being applied by the victim UE in implementing the process 600. In some aspects, the respective values for each of the detection threshold N, the call flow counter X, the timer $T_1$, the timer $T_2$, and/or the timer $T_3$ can be configurable by EFS.

In some aspects, an elapsed time can be measured from a most recently detected silent MT call of an MT attack and/or from a most recently detected non-verified MT call. For instance, the elapsed time from the most recently detected silent MT call and/or silent MT attack instance can be referred to as a fourth timer value $T_4$. In some examples, the elapsed time $T_4$ from the most recent non-verified MT call can be compared with a threshold value associated with resetting the attack detection call flow counter of block 602. For instance, if the elapsed time $T_4$ from the most recently detected silent MT call or silent MT call attack instance is greater than or equal to the rest threshold value associated with the timer $T_4$, the process 600 can include resetting the attack detection call flow counter (e.g., the value X, of block 602 of FIG. 6) to a value of X=1. In some aspects, resetting the attack detection call flow counter to X=1 can be used to reset the detection threshold value (e.g., the value N, of block 604 of FIG. 6) to N=N/X=N/1=N. For instance, resetting the attack detection call flow counter to X=1 based on the elapsed time $T_4$ being greater than or equal to the reset threshold can cause the process 600 of FIG. 6 to terminate the reduction in value of the detection threshold N, which may otherwise occur for successive rounds or iterations of the process 600. In some examples, the reset threshold associated with timer $T_4$ and the attack detection call flow counter X can be used to stop the continuous reduction of the value of the detection threshold N across successive rounds of process 600, in examples where the silent MT call attack is halted or temporarily paused.

In some examples, the call scoring engine of block 608 can be implemented to determine whether an incoming MT call request is legitimate or a potentially malicious call included in a silent MT call attack.

For instance, circuit-switched calls may be more likely to be legitimate calls (e.g., the calling party in a circuit-switched call is required to be a registered carrier user in order to place the call). Malicious calls, such as those included in a silent MT call attack, may be more likely to be placed over a packet-switched network. In some cases, silent MT call attacks can be performed based on using internet calling to spoof one or more legitimate phone numbers (e.g., using an open-source private branch exchange (PBX)).

In some aspects, the call scoring engine associated with block 608 of the silent MT call attack detection and mitigation process 600 can be implemented using a call scoring logic configured to determine whether an incoming MT call request is legitimate or fake (e.g., malicious, etc.). In one illustrative example, the call scoring engine logic can be implemented based on analyzing a session initiation protocol (SIP) INVITE request (e.g., a key-value pair). The call scoring engine logic may additionally analyze one or more security identity headers associated with the SIP INVITE request, and can be configured to determine a call verification score based on the respective values of the security identity headers and/or the SIP INVITE request. In some cases, larger numerical values of the call verification score may correspond to a greater probability that the scored call is a malicious call. In some examples, the call scoring engine logic can analyze one or more security identity headers such as P-Asserted-Identity, Secure Telephone Identity Revisited (STIR)/Signature-based Handling of Asserted Information Using toKENs (SHAKEN) (STIR/SHAKEN) verstat field, Remote-Party-ID, FROM headers, etc., which may be indicative of identity information associated with the calling party.

In some examples, the call scoring engine logic can be used to analyze one or more of a STIR/SHAKEN attestation level and/or a mobile operating system (mobile OS) firmware call evaluation information associated with an incoming MT call request and/or calling party identity thereof. In some aspects, the call scoring engine logic can be used to perform SIP INVITE request headers evaluation. In some examples, the call scoring engine logic can utilize information associated with a blacklist of proxy servers, analyzed against the Via header of an SIP INVITE request corresponding to an incoming MT call request.

In some aspects, the call scoring engine logic can determine a corresponding call verification score for one or more (or all) of the plurality of incoming MT call requests identified within the sliding time window $T_1$ of the silent MT call attack detection and mitigation process 600. In some examples, the call verification score for each incoming MT call request can be compared with one or more configured threshold values. For instance, if the call verification score is below a first threshold value, the corresponding incoming MT call request may be treated as legitimate and no mitigation is performed.

In another example, if the call verification score is greater than the first threshold value and less than a second threshold value, the corresponding incoming MT call request may be mitigated using the modem-level blocking of block 612 of process 600. In another example, if the call verification score is greater than the second threshold value, the corresponding incoming MT call request may be identified as a spoofed call and the IP Multimedia Subsystem (IMS) can be notified of the spoofed call.

In some aspects, the call scoring engine logic can determine the corresponding call verification score for a respective incoming MT call request based at least in part on a call attestation level score. For instance, the call scoring engine logic can be configured to score the attestation level added by the originating service provider in the SIP identity header. In some cases, the call scoring engine logic can be configured to evaluate the 'verstat' field in the 'P-Asserted-Identity' or 'From' headers. Based on the evaluation of the call attestation level score or call attestation level information, the IMS can be used to trigger the modem-level blocking of block 612 of process 600.

In some cases, the call attestation level scores may correspond to an attestation level 'A", indicative of an MT call request that is a legitimate call and can be trusted. An attestation level 'B' may be indicative of a partial attestation, where the service provider has authenticated the call origination but cannot verify the call source is authorized to use the calling number. An example of a partial attestation may be a telephone number behind an enterprise PBX. An attestation level 'C' may be indicative of a gateway attestation, where the service provider has authenticated the origin from which the service provider received the call, but has not authenticated the call source. An example of a gateway attestation may be a call received from an international gateway.

For instance, the SIP INVITE can include VERSTAT in the P-Asserted-Identity, with possible values of TN-Validation-Passed, TN-Validation-Failed, or No-TN-Validation. In some cases, if no VERSTAT value is present, the incoming SIP INVITE may not have included an Identity Header.

In some cases, the call scoring engine logic can be implemented based on one or more UE side checks. For instance, there may be no fully qualified domain name associated with the caller uniform resource identifier (URI) (e.g., 'FROM' header or 'P-Asserted-Identity' header). In some aspects, the call scoring engine logic can generate a relatively high call verification score if an IP address is associated instead of FQDN with the caller URI (e.g., considered unusual or abnormal behavior). For instance, a caller URI associated with a fully qualified domain name such as "one.att.net" may correspond to a relatively low call verification score, indicating that the call is legitimate. A caller URI that is not associated with a fully qualified domain name may be scored higher, indicative of a greater degree of uncertainty as to the legitimacy of the call. In another example, a caller URI that is an IP address (e.g., "10.198.146.9:5060") may correspond to a relatively high call verification score, indicating that the call is likely spoofed and/or non-legitimate.

In some examples, a blacklist of proxy servers can be maintained and may be EFS-injectable. In one illustrative example, when an incoming MT call attempt arrives, the call scoring engine logic can be configured to analyze the Via header of the INVITE request and compare with the blacklist of proxy servers. Based on a determination that a match exists, IMS can be used to trigger the modem-level blocking of the corresponding calling identity (e.g., block 612 of process 600). In some examples, the blacklist of proxy servers can grow dynamically, and may be stored in persistent storage of the UE (e.g., victim UE) used to implement the systems and techniques described herein.

Figure 7:
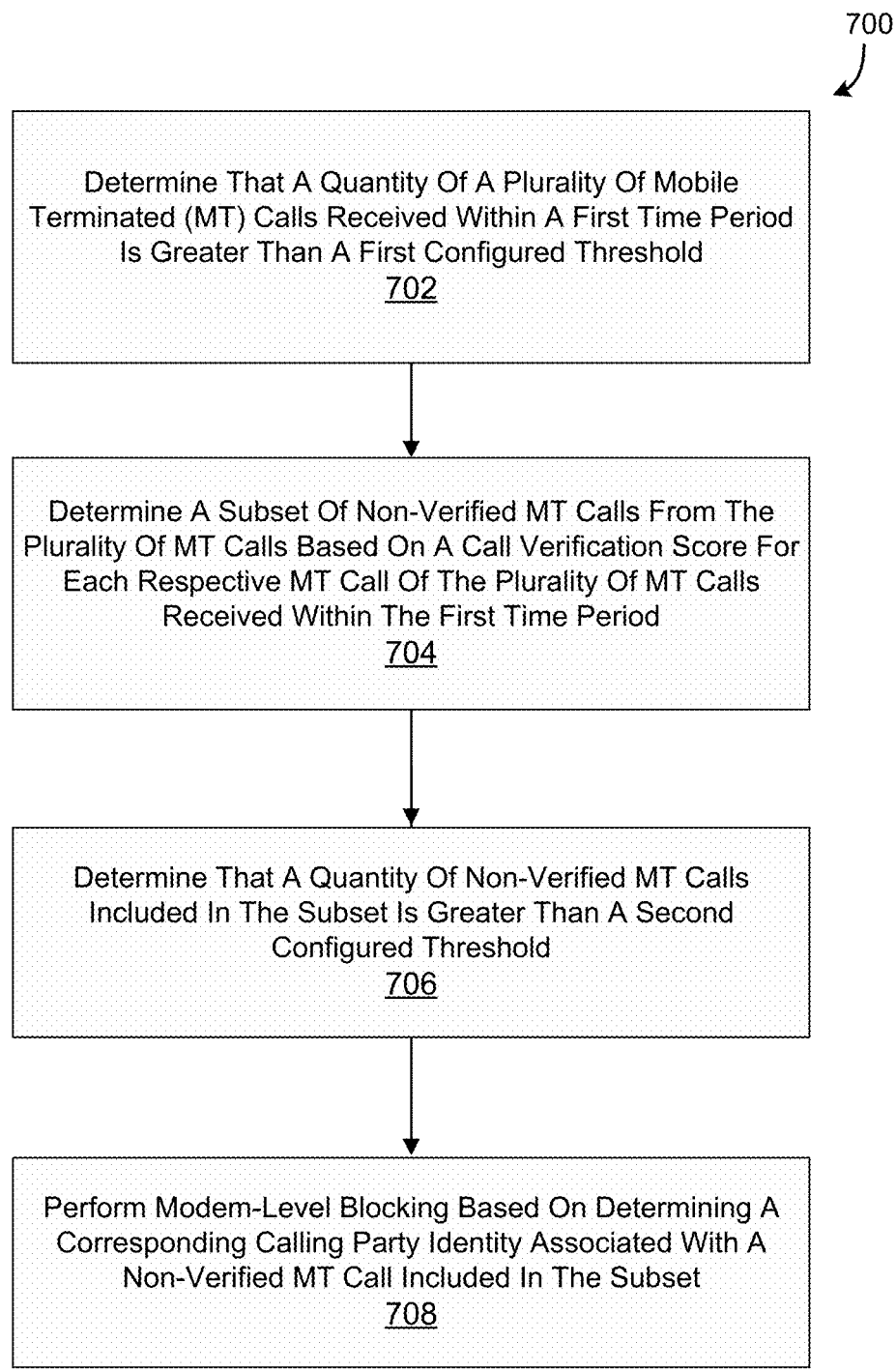
FIG. 7 is a flow diagram illustrating an example of a process for wireless communications, in accordance with some examples.

FIG. 7 is a flowchart diagram illustrating an example of a process 700 for wireless communications. The process 700 may be performed by a UE (e.g., a mobile device such as a mobile phone, a network-connected wearable such as a watch, an extended reality device such as a virtual reality (VR) device or augmented reality (AR) device, a vehicle or component or system of a vehicle, or other type of UE) or other type of network entity. The process 700 may be performed by a component or system (e.g., a chipset) of the UE or other type of network entity. In some examples, the UE can be the same as or similar to one or more of the UEs of any of FIG. 1, FIG. 2, FIG. 3, FIG. 4, etc. The operations of the process 700 may be implemented as software components that are executed and run on one or more processors (e.g., processor 810 of FIG. 8 or other processor(s)). Further, the transmission and reception of signals by the wireless communications device in the process 700 may be enabled, for example, by one or more antennas and/or one or more transceivers (e.g., antenna(s) and/or wireless transceiver(s) of any of FIG. 2, FIG. 4, etc.).

At block 702, the process 700 includes determining that a quantity of a plurality of Mobile Terminated (MT) calls received within a first time period is greater than a first configured threshold. For instance, the plurality of MT calls can include one or more incoming MT calls (e.g., incoming MT call requests) received by a UE, where each respective MT call of the plurality of MT calls is the same as or similar to one or more of the incoming MT call 510 of FIG. 5A, the incoming MT call 560 of FIG. 5B, etc.

In some cases, the quantity of the plurality of MT calls can be the same as or similar to the quantity of MT calls detected at block 604 of FIG. 6. In some examples, the first time period can be a sliding time window with a configured length. For instance, the first time period can be the same as or similar to the sliding time window $T_1$ of FIG. 6. In some cases, the determination of block 702 that a quantity of a plurality of MT calls received within a first time period is greater than a first configured threshold can be the same as or similar to one or more (or both) of block 604 and/or block 606 of FIG. 6.

In some cases, the first configured threshold can be a configured detection threshold corresponding to a silent MT call attack. For instance, the first configured threshold can be the same as or similar to the detection threshold value N of block 604 of FIG. 6. In some examples, the first configured threshold can be the same as or similar to the detection threshold value N=N/X of block 604 of FIG. 6.

At block 704, the process 700 includes determining a subset of non-verified MT calls from the plurality of MT calls based on a call verification score for each respective MT call of the plurality of MT calls received within the first time period. For instance, the subset of non-verified MT calls can be the same as or similar to the (N-N') non-verified MT calls determined in block 608 and/or block 610 of FIG. 6. In some cases, the call verification score can be determined using a call scoring engine, which may be the same as or similar to the call scoring engine of block 608 of FIG. 6.

In some examples, the call verification score for each respective MT call of the plurality of MT calls can be implemented by block 608 of FIG. 6. In some cases, the call verification score for each respective MT call of the plurality of MT calls can be determined based on analyzing respective calling party identity information associated with each respective MT call of the plurality of MT calls. In some cases, the respective calling party identity information can be included in a session initiation protocol (SIP) INVITE request corresponding to the respective MT call. For instance, the respective calling party identity information can be included in one or more security identity headers of the SIP INVITE request corresponding to the respective MT call. In some cases, the one or more security identity headers can include at least one of a P-Asserted-Identity header or a verstat field.

At block 706, the process 700 includes determining that a quantity of non-verified MT calls included in the subset is greater than a second configured threshold. For instance, the quantity of non-verified MT calls included in the subset can be the same as or similar to the quantity of non-verified calls (N-N') of block 610 of FIG. 6. In some cases, the second configured threshold can be the same as or similar to the configured EFS threshold T of block 610 of FIG. 6.

At block 708, the process 700 includes performing modem-level blocking based on determining a corresponding calling party identity associated with a non-verified MT call included in the subset. For instance, the modem-level blocking can be implemented based on the modem-level blocking of block 612 of FIG. 6. In some cases, the modem-level blocking can be performed by or using a modem of a UE configured to implement the process 700 of FIG. 7 (and/or the process 600 of FIG. 6). In some examples, performing modem-level blocking can be based on blacklisting the corresponding calling party identity using the modem. In some examples, performing the modem-level blocking can include performing modem-level blocking of a corresponding calling party identity associated with each respective non-verified MT call included in the subset.

In some cases, the modem-level blocking can be implemented based on determining an elapsed time from implementation of the modem-level blocking in a modem of the UE. The elapsed time from implementation of the modem-level blocking can be compared to a configured time threshold value. For instance, the configured time threshold value can be a second timer or time window value, such as the time $T_2$ of block 612 of FIG. 6. In some cases, the comparison of the elapsed time to the configured time threshold value can be the same as or similar to the determination $T_2$ expired of block 614 of FIG. 6.

In some cases, the modem-level blocking can be maintained for the corresponding calling party identity associated with each respective non-verified MT call, based on the elapsed time being less than the configured time threshold value. For instance, modem-level blocking can be maintained for each respective non-verified MT call of the subset of the plurality of MT calls based on a determination that the elapsed time from initiating the modem-level blocking is less than the time $T_2$ of FIG. 6.

In some cases, the modem-level blocking can be removed for the corresponding calling party identity associated with each respective non-verified MT call, based on the elapsed time being greater than the configured time threshold value.

In some examples, the modem-level blocking can be removed based on a determination that a configured timer value has expired, and based on the configured timer value (e.g., time $T_2$ of FIG. 6) expiring, a call flow counter can be incremented. A value of the call flow counter can be indicative of a number of times modem-level blocking has been performed. For instance, the call flow counter can be the same as or similar to the attack detection call flow counter X of blocks 602 and/or 616 of FIG. 6. In some examples, incrementing the value of the call flow counter can be the same as or similar to block 616 of FIG. 6. In some cases, the first configured threshold comprises a configured quantity (e.g., N of FIG. 6) divided by the call flow counter (e.g., X of FIG. 6).

In some examples, the process 700 includes storing history information indicative of the corresponding calling party identity associated with each respective non-verified MT call associated with the modem-level blocking. In some examples, a subsequent MT call associated with a respective calling party identity can be received, and compared to the history information. For instance, the calling party identity of a received MT call (e.g., of block 702 of process 700) can be compared to the calling party identities stored in the history information of previously blocked calling party identities of non-verified MT calls. Based on a determination that the respective calling party identity is included in the history information, the process 700 can include performing modem-level blocking of the respective calling party identity without determining a call verification score for the subsequent MT call.

In some cases, modem-level blocking of the respective calling party identity can be performed (e.g., maintained by the modem) for a first length of time based on the respective calling party identity not being included in the history information. For instance, modem-level blocking can be performed for the time $T_2$ of blocks 612 and 614 of FIG. 6, based on the respective calling party identity not being included in the history information of previously blocked calling party identities associated with non-verified MT calls. In some examples, modem-level blocking of the respective calling party identity can be performed for a second length of time based on the respective calling party identity being included in the history information, wherein the second length of time is greater than the first length of time. For instance, the second length of time can be a multiple (e.g., an integer multiple, a fractional or decimal multiple, etc.) of the first length of time (e.g., time $T_2$ of FIG. 6).

In some cases, the process 700 can include determining an elapsed time from a first instance of the modem-level blocking, and comparing the elapsed time to a third time threshold. In some examples, the third time threshold is a configured random value. For instance, the third time threshold can be a random timer value $T_3$. In some cases, the modem-level blocking of block 708 of FIG. 7 and/or the modem-level blocking of block 612 of FIG. 6 can be removed based on the elapsed time from implementing the modem-level blocking being greater than the configured random value of the third time threshold (e.g., $T_3$).

In some examples, the processes described herein (e.g., process 700 and/or other process described herein) may be performed by a computing device or apparatus (e.g., a network node such as a UE, base station, a portion of a base station, etc.). For instance, as noted above, the process 700 may be performed by a UE or a component thereof. In another example, the process 700 may be performed by a computing device with the computing system 800 shown in FIG. 8. For instance, a wireless communication device with the computing architecture shown in FIG. 8 may include the components of the UE and may implement the operations of FIG. 7.

In some cases, the computing device or apparatus may include various components, such as one or more input devices, one or more output devices, one or more processors, one or more microprocessors, one or more microcomputers, one or more cameras, one or more sensors, and/or other component(s) that are configured to carry out the steps of processes described herein. In some examples, the computing device may include a display, one or more network interfaces configured to communicate and/or receive the data, any combination thereof, and/or other component(s). The one or more network interfaces may be configured to communicate and/or receive wired and/or wireless data, including data according to the 3G, 4G, 5G, and/or other cellular standard, data according to the WiFi (802.11x) standards, data according to the Bluetooth™ standard, data according to the Internet Protocol (IP) standard, and/or other types of data.

The components of the computing device may be implemented in circuitry. For example, the components may include and/or may be implemented using electronic circuits or other electronic hardware, which may include one or more programmable electronic circuits (e.g., microprocessors, graphics processing units (GPUs), digital signal processors (DSPs), central processing units (CPUs), and/or other suitable electronic circuits), and/or may include and/or be implemented using computer software, firmware, or any combination thereof, to perform the various operations described herein.

The process 700 is illustrated as a logical flow diagram, the operation of which represents a sequence of operations that may be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations may be combined in any order and/or in parallel to implement the processes.

Additionally, the process 700 and/or other process described herein, may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

Figure 8:
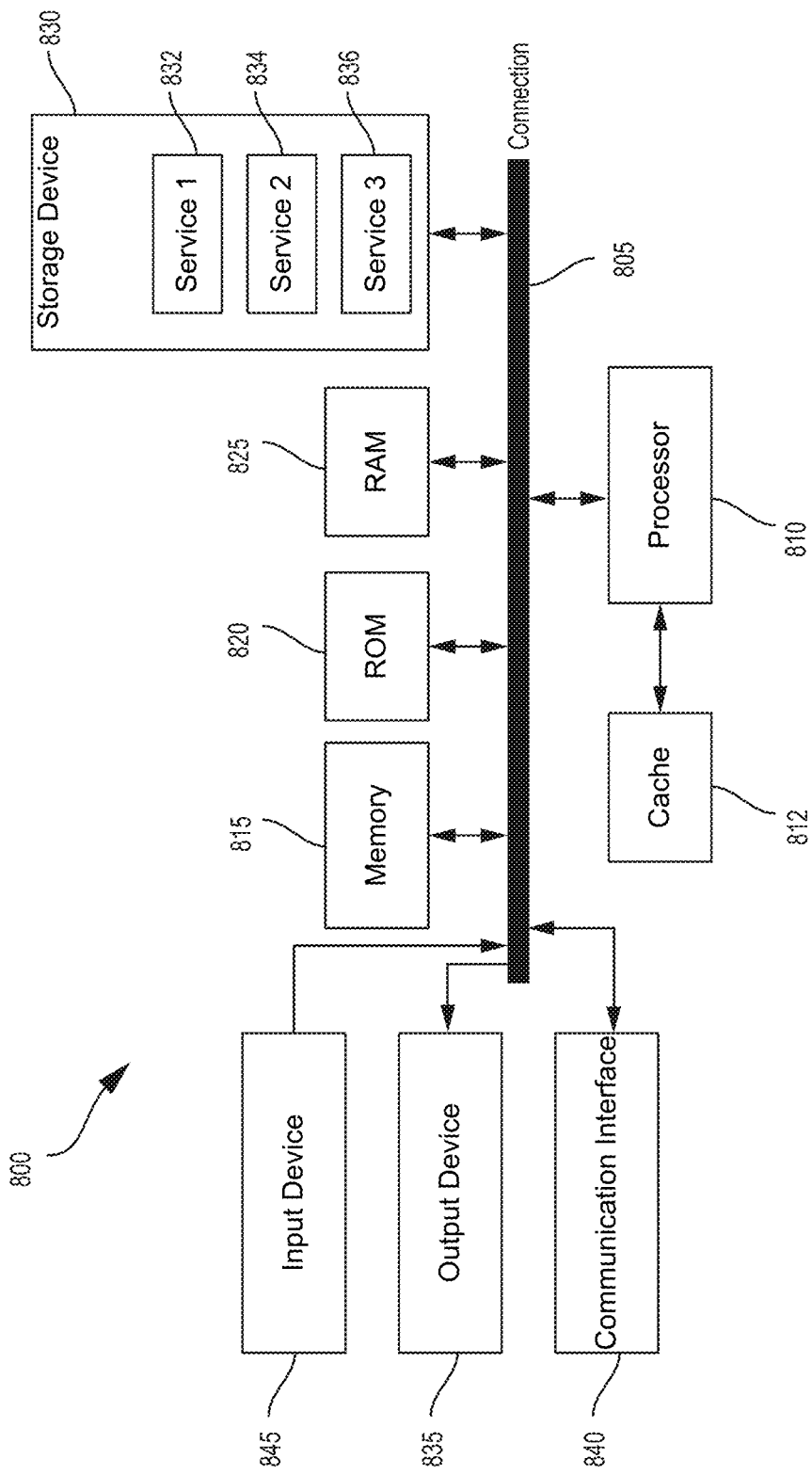
FIG. 8 is a block diagram illustrating an example of a computing system, in accordance with some examples.

FIG. 8 is a diagram illustrating an example of a system for implementing certain aspects of the present technology. In particular, FIG. 8 illustrates an example of computing system 800, which may be for example any computing device making up internal computing system, a remote computing system, a camera, or any component thereof in which the components of the system are in communication with each other using connection 805. Connection 805 may be a physical connection using a bus, or a direct connection into processor 810, such as in a chipset architecture. Connection 805 may also be a virtual connection, networked connection, or logical connection.

In some aspects, computing system 800 is a distributed system in which the functions described in this disclosure may be distributed within a datacenter, multiple data centers, a peer network, etc. In some aspects, one or more of the described system components represents many such components each performing some or all of the function for which the component is described. In some aspects, the components may be physical or virtual devices.

Example system 800 includes at least one processing unit (CPU or processor) 810 and connection 805 that communicatively couples various system components including system memory 815, such as read-only memory (ROM) 820 and random access memory (RAM) 825 to processor 810. Computing system 800 may include a cache 815 of high-speed memory connected directly with, in close proximity to, or integrated as part of processor 810.

Processor 810 may include any general-purpose processor and a hardware service or software service, such as services 832, 834, and 836 stored in storage device 830, configured to control processor 810 as well as a special-purpose processor where software instructions are incorporated into the actual processor design. Processor 810 may essentially be a completely self-contained computing system, containing multiple cores or processors, a bus, memory controller, cache, etc. A multi-core processor may be symmetric or asymmetric.

To enable user interaction, computing system 800 includes an input device 845, which may represent any number of input mechanisms, such as a microphone for speech, a touch-sensitive screen for gesture or graphical input, keyboard, mouse, motion input, speech, etc. Computing system 800 may also include output device 835, which may be one or more of a number of output mechanisms. In some instances, multimodal systems may enable a user to provide multiple types of input/output to communicate with computing system 800.

Computing system 800 may include communications interface 840, which may generally govern and manage the user input and system output. The communication interface may perform or facilitate receipt and/or transmission wired or wireless communications using wired and/or wireless transceivers, including those making use of an audio jack/plug, a microphone jack/plug, a universal serial bus (USB) port/plug, an Apple™ Lightning™ port/plug, an Ethernet port/plug, a fiber optic port/plug, a proprietary wired port/plug, 3G, 4G, 5G and/or other cellular data network wireless signal transfer, a Bluetooth™ wireless signal transfer, a Bluetooth™ low energy (BLE) wireless signal transfer, an IBEACON™ wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof. The communications interface 840 may also include one or more Global Navigation Satellite System (GNSS) receivers or transceivers that are used to determine a location of the computing system 800 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 830 may be a non-volatile and/or non-transitory and/or computer-readable memory device and may be a hard disk or other types of computer readable media which may store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (e.g., Level 1 (L1) cache, Level 2 (L2) cache, Level 3 (L3) cache, Level 4 (L4) cache, Level 5 (L5) cache, or other (L #) cache), resistive random-access memory (RRAM/ReRAM), phase change memory (PCM), spin transfer torque RAM (STT-RAM), another memory chip or cartridge, and/or a combination thereof.

The storage device 830 may include software services, servers, services, etc., that when the code that defines such software is executed by the processor 810, it causes the system to perform a function. In some aspects, a hardware service that performs a particular function may include the software component stored in a computer-readable medium in connection with the necessary hardware components, such as processor 810, connection 805, output device 835, etc., to carry out the function. The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data may be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc., may be passed, forwarded, or transmitted via any suitable means including memory sharing, message passing, token passing, network transmission, or the like.

Specific details are provided in the description above to provide a thorough understanding of the aspects and examples provided herein, but those skilled in the art will recognize that the application is not limited thereto. Thus, while illustrative aspects of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects may be utilized in any number of environments and applications beyond those described herein without departing from the broader scope of the specification. The specification and drawings are, accordingly, to be regarded as illustrative rather than restrictive. For the purposes of illustration, methods were described in a particular order. It should be appreciated that in alternate aspects, the methods may be performed in a different order than that described.

For clarity of explanation, in some instances the present technology may be presented as including individual functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the aspects.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

Individual aspects may be described above as a process or method which is depicted as a flowchart, a flow diagram, a data flow diagram, a structure diagram, or a block diagram. Although a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

Processes and methods according to the above-described examples may be implemented using computer-executable instructions that are stored or otherwise available from computer-readable media. Such instructions may include, for example, instructions and data which cause or otherwise configure a general purpose computer, special purpose computer, or a processing device to perform a certain function or group of functions. Portions of computer resources used may be accessible over a network. The computer executable instructions may be, for example, binaries, intermediate format instructions such as assembly language, firmware, source code. Examples of computer-readable media that may be used to store instructions, information used, and/or information created during methods according to described examples include magnetic or optical disks, flash memory, USB devices provided with non-volatile memory, networked storage devices, and so on.

In some aspects the computer-readable storage devices, mediums, and memories may include a cable or wireless signal containing a bitstream and the like. However, when mentioned, non-transitory computer-readable storage media expressly exclude media such as energy, carrier signals, electromagnetic waves, and signals per se.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof, in some cases depending in part on the particular application, in part on the desired design, in part on the corresponding technology, etc.

The various illustrative logical blocks, modules, and circuits described in connection with the aspects disclosed herein may be implemented or performed using hardware, software, firmware, middleware, microcode, hardware description languages, or any combination thereof, and may take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Examples of form factors include laptops, smart phones, mobile phones, tablet devices or other small form factor personal computers, personal digital assistants, rackmount devices, standalone devices, and so on. Functionality described herein also may be embodied in peripherals or add-in cards. Such functionality may also be implemented on a circuit board among different chips or different processes executing in a single device, by way of further example.

The instructions, media for conveying such instructions, computing resources for executing them, and other structures for supporting such computing resources are example means for providing the functions described in the disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods, algorithms, and/or operations described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that may be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general-purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

One of ordinary skill will appreciate that the less than ("<") and greater than (">") symbols or terminology used herein may be replaced with less than or equal to ("≤") and greater than or equal to ("≥") symbols, respectively, without departing from the scope of this description.

Where components are described as being "configured to" perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

The phrase "coupled to" or "communicatively coupled to" refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, A and B and C, or any duplicate information or data (e.g., A and A, B and B, C and C, A and A and B, and so on), or any other ordering, duplication, or combination of A, B, and C. The language "at least one of" a set and/or "one or more" of a set does not limit the set to the items listed in the set. For example, claim language reciting "at least one of A and B" or "at least one of A or B" may mean A, B, or A and B, and may additionally include items not listed in the set of A and B. The phrases "at least one" and "one or more" are used interchangeably herein.

Claim language or other language reciting "at least one processor configured to," "at least one processor being configured to," "one or more processors configured to," "one or more processors being configured to," or the like indicates that one processor or multiple processors (in any combination) can perform the associated operation(s). For example, claim language reciting "at least one processor configured to: X, Y, and Z" means a single processor can be used to perform operations X, Y, and Z; or that multiple processors are each tasked with a certain subset of operations X, Y, and Z such that together the multiple processors perform X, Y, and Z; or that a group of multiple processors work together to perform operations X, Y, and Z. In another example, claim language reciting "at least one processor configured to: X, Y, and Z" can mean that any single processor may only perform at least a subset of operations X, Y, and Z.

Where reference is made to one or more elements performing functions (e.g., steps of a method), one element may perform all functions, or more than one element may collectively perform the functions. When more than one element collectively performs the functions, each function need not be performed by each of those elements (e.g., different functions may be performed by different elements) and/or each function need not be performed in whole by only one element (e.g., different elements may perform different sub-functions of a function). Similarly, where reference is made to one or more elements configured to cause another element (e.g., an apparatus) to perform functions, one element may be configured to cause the other element to perform all functions, or more than one element may collectively be configured to cause the other element to perform the functions.

Where reference is made to an entity (e.g., any entity or device described herein) performing functions or being configured to perform functions (e.g., steps of a method), the entity may be configured to cause one or more elements (individually or collectively) to perform the functions. The one or more components of the entity may include at least one memory, at least one processor, at least one communication interface, another component configured to perform one or more (or all) of the functions, and/or any combination thereof. Where reference to the entity performing functions, the entity may be configured to cause one component to perform all functions, or to cause more than one component to collectively perform the functions. When the entity is configured to cause more than one component to collectively perform the functions, each function need not be performed by each of those components (e.g., different functions may be performed by different components) and/or each function need not be performed in whole by only one component (e.g., different components may perform different sub-functions of a function).

Illustrative aspects of the disclosure include:

Aspect 1. An apparatus of a user equipment (UE) for wireless communication, comprising: a memory; and a processor coupled to the memory, wherein the processor is configured to: determine that a quantity of a plurality of Mobile Terminated (MT) calls received within a first time period is greater than a first configured threshold; determine a subset of non-verified MT calls from the plurality of MT calls based on a call verification score for each respective MT call of the plurality of MT calls received within the first time period; determine that a quantity of non-verified MT calls included in the subset is greater than a second configured threshold; and perform modem-level blocking based on determining a corresponding calling party identity associated with a non-verified MT call included in the subset.

Aspect 2. The apparatus of Aspect 1, wherein the apparatus further comprises a modem.

Aspect 3. The apparatus of Aspect 2, wherein, to perform modem-level blocking, the at least one processor is configured to blacklist the corresponding calling party identity using the modem.

Aspect 4. The apparatus of any of Aspects 1 to 3, wherein, to perform modem-level blocking, the at least one processor is configured to: perform modem-level blocking of a corresponding calling party identity associated with each respective non-verified MT call included in the subset.

Aspect 5. The apparatus of any of Aspects 1 to 4, wherein the processor is further configured to: determine an elapsed time from implementation of the modem-level blocking in a modem of the UE; and compare the elapsed time to a configured time threshold value.

Aspect 6. The apparatus of Aspect 5, wherein the processor is further configured to: maintain the modem-level blocking for the corresponding calling party identity associated with each respective non-verified MT call, based on the elapsed time being less than the configured time threshold value.

Aspect 7. The apparatus of any of Aspects 5 to 6, wherein the processor is further configured to: remove the modem-level blocking for the corresponding calling party identity associated with each respective non-verified MT call, based on the elapsed time being greater than the configured time threshold value.

Aspect 8. The apparatus of any of Aspects 1 to 7, wherein the first time period comprises a sliding time window with a configured length.

Aspect 9. The apparatus of Aspect 8, wherein the processor is further configured to: remove the modem-level blocking based on a determination that a configured timer value has expired; and increment a call flow counter, wherein a value of the call flow counter is indicative of a number of times modem-level blocking has been performed.

Aspect 10. The apparatus of Aspect 9, wherein the first configured threshold comprises a configured quantity divided by the call flow counter.

Aspect 11. The apparatus of any of Aspects 1 to 10, wherein the processor is further configured to: store history information indicative of the corresponding calling party identity associated with each respective non-verified MT call associated with the modem-level blocking.

Aspect 12. The apparatus of Aspect 11, wherein the processor is further configured to: receive a subsequent MT call associated with a respective calling party identity; compare the respective calling party identity to the history information; and based on a determination that the respective calling party identity is included in the history information, perform modem-level blocking of the respective calling party identity without determining a call verification score for the subsequent MT call.

Aspect 13. The apparatus of Aspect 12, wherein the processor is further configured to: perform modem-level blocking of the respective calling party identity for a first length of time based on the respective calling party identity not being included in the history information; and perform modem-level blocking of the respective calling party identity for a second length of time based on the respective calling party identity being included in the history information, wherein the second length of time is greater than the first length of time.

Aspect 14. The apparatus of any of Aspects 1 to 13, wherein the processor is further configured to: determine an elapsed time from a first instance of the modem-level blocking; compare the elapsed time to a third time threshold, wherein the third time threshold is a configured random value; and remove the modem-level blocking based on the elapsed time being greater than the configured random value of the third time threshold.

Aspect 15. The apparatus of any of Aspects 1 to 14, wherein the first configured threshold comprises a configured detection threshold corresponding to a silent MT call attack.

Aspect 16. The apparatus of any of Aspects 1 to 15, wherein, to determine the call verification score for each respective MT call, the processor is configured to: analyze respective calling party identity information associated with each respective MT call of the plurality of MT calls, wherein the respective calling party identity information is included in a session initiation protocol (SIP) INVITE request corresponding to the respective MT call.

Aspect 17. The apparatus of Aspect 16, wherein the respective calling party identity information is included in one or more security identity headers of the SIP INVITE request corresponding to the respective MT call.

Aspect 18. The apparatus of Aspect 17, wherein the one or more security identity headers include at least one of a P-Asserted-Identity header or a verstat field.

Aspect 19. A method for wireless communication by a user equipment (UE), the method comprising: determining that a quantity of a plurality of Mobile Terminated (MT) calls received within a first time period is greater than a first configured threshold; determining a subset of non-verified MT calls from the plurality of MT calls based on a call verification score for each respective MT call of the plurality of MT calls received within the first time period; determining that a quantity of non-verified MT calls included in the subset is greater than a second configured threshold; and performing modem-level blocking based on determining a corresponding calling party identity associated with a non-verified MT call included in the subset.

Aspect 20. The method of Aspect 19, wherein the modem-level blocking is performed using a modem of the UE.

Aspect 21. The method of Aspect 20, wherein performing modem-level blocking comprises using the modem of the UE to blacklist the corresponding calling party identity.

Aspect 22. The method of any of Aspects 19 to 21, wherein performing modem-level blocking comprises: performing modem-level blocking of a corresponding calling party identity associated with each respective non-verified MT call included in the subset.

Aspect 23. The method of any of Aspects 19 to 22, further comprising: determining an elapsed time from implementation of the modem-level blocking in a modem of the UE; and comparing the elapsed time to a configured time threshold value.

Aspect 24. The method of Aspect 23, further comprising: maintaining the modem-level blocking for the corresponding calling party identity associated with each respective non-verified MT call, based on the elapsed time being less than the configured time threshold value.

Aspect 25. The method of any of Aspects 23 to 24, further comprising: removing the modem-level blocking for the corresponding calling party identity associated with each respective non-verified MT call, based on the elapsed time being greater than the configured time threshold value.

Aspect 26. The method of any of Aspects 19 to 25, wherein the first time period comprises a sliding time window with a configured length.

Aspect 27. The method of Aspect 26, further comprising: removing the modem-level blocking based on a determination that a configured timer value has expired; and incrementing a call flow counter, wherein a value of the call flow counter is indicative of a number of times modem-level blocking has been performed.

Aspect 28. The method of Aspect 27, wherein the first configured threshold comprises a configured quantity divided by the call flow counter.

Aspect 29. The method of any of Aspects 19 to 28, further comprising: storing history information indicative of the corresponding calling party identity associated with each respective non-verified MT call associated with the modem-level blocking.

Aspect 30. The method of Aspect 29, further comprising: receiving a subsequent MT call associated with a respective calling party identity; comparing the respective calling party identity to the history information; and based on a determination that the respective calling party identity is included in the history information, performing modem-level blocking of the respective calling party identity without determining a call verification score for the subsequent MT call.

Aspect 31. The method of Aspect 30, further comprising: performing modem-level blocking of the respective calling party identity for a first length of time based on the respective calling party identity not being included in the history information; and performing modem-level blocking of the respective calling party identity for a second length of time based on the respective calling party identity being included in the history information, wherein the second length of time is greater than the first length of time.

Aspect 32. The method of any of Aspects 19 to 31, further comprising: determining an elapsed time from a first instance of the modem-level blocking; comparing the elapsed time to a third time threshold, wherein the third time threshold is a configured random value; and removing the modem-level blocking based on the elapsed time being greater than the configured random value of the third time threshold.

Aspect 33. The method of any of Aspects 19 to 32, wherein the first configured threshold comprises a configured detection threshold corresponding to a silent MT call attack.

Aspect 34. The method of any of Aspects 19 to 33, further comprising determining the call verification score for each respective MT call based on analyzing respective calling party identity information associated with each respective MT call of the plurality of MT calls, wherein the respective calling party identity information is included in a session initiation protocol (SIP) INVITE request corresponding to the respective MT call.

Aspect 35. The method of Aspect 34, wherein the respective calling party identity information is included in one or more security identity headers of the SIP INVITE request corresponding to the respective MT call.

Aspect 36. The method of Aspect 35, wherein the one or more security identity headers include at least one of a P-Asserted-Identity header or a verstat field.

Aspect 37. A non-transitory computer-readable storage medium comprising instructions stored thereon which, when executed by at least one processor, causes the at least one processor to perform operations according to any of Aspects 1 to 18.

Aspect 38. A non-transitory computer-readable storage medium comprising instructions stored thereon which, when executed by at least one processor, causes the at least one processor to perform operations according to any of Aspects 19 to 35.

Aspect 39. An apparatus for wireless communication comprising one or more means for performing operations according to any of Aspects 1 to 18.

Aspect 40. An apparatus for wireless communication comprising one or more means for performing operations according to any of Aspects 19 to 35.

What is claimed is:

1. An apparatus of a user equipment (UE) for wireless communication, comprising:
   a memory; and
   a processor coupled to the memory, wherein the processor is configured to:
      determine that a quantity of a plurality of Mobile Terminated (MT) calls received within a first time period is greater than a first configured threshold;
      determine a subset of non-verified MT calls from the plurality of MT calls based on a call verification score for each respective MT call of the plurality of MT calls received within the first time period;
      determine that a quantity of non-verified MT calls included in the subset is greater than a second configured threshold; and
      perform modem-level blocking based on determining a corresponding calling party identity associated with a non-verified MT call included in the subset.

2. The apparatus of claim 1, wherein the apparatus further comprises a modem, and wherein, to perform modem-level blocking, the at least one processor is configured to blacklist the corresponding calling party identity using the modem.

3. The apparatus of claim 1, wherein, to perform modem-level blocking, the at least one processor is configured to:
   perform modem-level blocking of a corresponding calling party identity associated with each respective non-verified MT call included in the subset.

4. The apparatus of claim 1, wherein the processor is further configured to:
   determine an elapsed time from implementation of the modem-level blocking in a modem of the UE; and
   compare the elapsed time to a configured time threshold value.

5. The apparatus of claim 4, wherein the processor is further configured to:
maintain the modem-level blocking for the corresponding calling party identity associated with each respective non-verified MT call, based on the elapsed time being less than the configured time threshold value.

6. The apparatus of claim 4, wherein the processor is further configured to:
remove the modem-level blocking for the corresponding calling party identity associated with each respective non-verified MT call, based on the elapsed time being greater than the configured time threshold value.

7. The apparatus of claim 1, wherein the first time period comprises a sliding time window with a configured length.

8. The apparatus of claim 7, wherein the processor is further configured to:
remove the modem-level blocking based on a determination that a configured timer value has expired; and
increment a call flow counter, wherein a value of the call flow counter is indicative of a number of times modem-level blocking has been performed.

9. The apparatus of claim 8, wherein the first configured threshold comprises a configured quantity divided by the call flow counter.

10. The apparatus of claim 1, wherein the processor is further configured to:
store history information indicative of the corresponding calling party identity associated with each respective non-verified MT call associated with the modem-level blocking.

11. The apparatus of claim 10, wherein the processor is further configured to:
receive a subsequent MT call associated with a respective calling party identity;
compare the respective calling party identity to the history information; and
based on a determination that the respective calling party identity is included in the history information, perform modem-level blocking of the respective calling party identity without determining a call verification score for the subsequent MT call.

12. The apparatus of claim 11, wherein the processor is further configured to:
perform modem-level blocking of the respective calling party identity for a first length of time based on the respective calling party identity not being included in the history information; and
perform modem-level blocking of the respective calling party identity for a second length of time based on the respective calling party identity being included in the history information, wherein the second length of time is greater than the first length of time.

13. The apparatus of claim 1, wherein the processor is further configured to:
determine an elapsed time from a first instance of the modem-level blocking;
compare the elapsed time to a third time threshold, wherein the third time threshold is a configured random value; and
remove the modem-level blocking based on the elapsed time being greater than the configured random value of the third time threshold.

14. The apparatus of claim 1, wherein the first configured threshold comprises a configured detection threshold corresponding to a silent MT call attack.

15. The apparatus of claim 1, wherein, to determine the call verification score for each respective MT call, the processor is configured to:
analyze respective calling party identity information associated with each respective MT call of the plurality of MT calls, wherein the respective calling party identity information is included in a session initiation protocol (SIP) INVITE request corresponding to the respective MT call.

16. The apparatus of claim 15, wherein the respective calling party identity information is included in one or more security identity headers of the SIP INVITE request corresponding to the respective MT call.

17. The apparatus of claim 16, wherein the one or more security identity headers include at least one of a P-Asserted-Identity header or a verstat field.

18. A method for wireless communication by a user equipment (UE), the method comprising:
determining that a quantity of a plurality of Mobile Terminated (MT) calls received within a first time period is greater than a first configured threshold;
determining a subset of non-verified MT calls from the plurality of MT calls based on a call verification score for each respective MT call of the plurality of MT calls received within the first time period;
determining that a quantity of non-verified MT calls included in the subset is greater than a second configured threshold; and
performing modem-level blocking based on determining a corresponding calling party identity associated with a non-verified MT call included in the subset.

19. The method of claim 18, wherein the modem-level blocking is performed using a modem of the UE, and wherein performing modem-level blocking comprises using the modem of the UE to blacklist the corresponding calling party identity.

20. The method of claim 18, wherein performing modem-level blocking comprises:
performing modem-level blocking of a corresponding calling party identity associated with each respective non-verified MT call included in the subset.

21. The method of claim 18, further comprising:
determining an elapsed time from implementation of the modem-level blocking in a modem of the UE; and
comparing the elapsed time to a configured time threshold value.

22. The method of claim 21, further comprising:
maintaining the modem-level blocking for the corresponding calling party identity associated with each respective non-verified MT call, based on the elapsed time being less than the configured time threshold value.

23. The method of claim 21, further comprising:
removing the modem-level blocking for the corresponding calling party identity associated with each respective non-verified MT call, based on the elapsed time being greater than the configured time threshold value.

24. The method of claim 18, wherein the first time period comprises a sliding time window with a configured length.

25. The method of claim 24, further comprising:
removing the modem-level blocking based on a determination that a configured timer value has expired; and
incrementing a call flow counter, wherein a value of the call flow counter is indicative of a number of times modem-level blocking has been performed.

26. The method of claim 25, wherein the first configured threshold comprises a configured quantity divided by the call flow counter.

27. The method of claim 18, further comprising:
storing history information indicative of the corresponding calling party identity associated with each respective non-verified MT call associated with the modem-level blocking.

28. The method of claim 27, further comprising:
receiving a subsequent MT call associated with a respective calling party identity;
comparing the respective calling party identity to the history information; and
based on a determination that the respective calling party identity is included in the history information, performing modem-level blocking of the respective calling party identity without determining a call verification score for the subsequent MT call.

29. The method of claim 28, further comprising:
performing modem-level blocking of the respective calling party identity for a first length of time based on the respective calling party identity not being included in the history information; and
performing modem-level blocking of the respective calling party identity for a second length of time based on the respective calling party identity being included in the history information, wherein the second length of time is greater than the first length of time.

30. The method of claim 18, further comprising:
determining an elapsed time from a first instance of the modem-level blocking;
comparing the elapsed time to a third time threshold, wherein the third time threshold is a configured random value; and
removing the modem-level blocking based on the elapsed time being greater than the configured random value of the third time threshold.

* * * * *